United States Patent
Bai et al.

(10) Patent No.: US 10,074,280 B2
(45) Date of Patent: Sep. 11, 2018

(54) VEHICLE PEDESTRIAN SAFETY SYSTEM AND METHODS OF USE AND MANUFACTURE THEREOF

(71) Applicant: Honda Motor Co., Ltd., Tokyo (JP)

(72) Inventors: Xue Bai, Novi, MI (US); Radovan Miucic, Southfield, MI (US)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 15/832,555

(22) Filed: Dec. 5, 2017

(65) Prior Publication Data

US 2018/0096605 A1    Apr. 5, 2018

Related U.S. Application Data

(63) Continuation of application No. 15/673,383, filed on Aug. 9, 2017, now Pat. No. 9,922,564, which is a
(Continued)

(51) Int. Cl.
*B60Q 1/00* (2006.01)
*G08G 1/16* (2006.01)
*B60K 35/00* (2006.01)

(52) U.S. Cl.
CPC ............. *G08G 1/166* (2013.01); *B60K 35/00* (2013.01); *G08G 1/161* (2013.01); *B60K 2350/1096* (2013.01); *B60K 2350/2052* (2013.01)

(58) Field of Classification Search
CPC ........ G08G 1/166; G08G 1/161; B60K 35/00; B60K 2350/1096; B60K 2350/2052
(Continued)

(56) References Cited

U.S. PATENT DOCUMENTS 6,218,947 B1    4/2001   Sutherland
6,337,637 B1    8/2002   Kubota et al.
(Continued)

FOREIGN PATENT DOCUMENTS

CN    101398982    4/2009
EP      2511121   10/2012
(Continued)

OTHER PUBLICATIONS

Pierre Merdrignac, 'Cooperative perception and communication system for protection of vulnerable road users', National Institute for Research in Computer Science and Control, RITS—Robotics and Intelligent Transportation Systems.
(Continued)

*Primary Examiner* — Ojiako Nwugo
(74) *Attorney, Agent, or Firm* — Rankin, Hill & Clark LLP

(57) ABSTRACT

A vehicle-to-pedestrian (V2P) communication system and method of operating same including acquiring V2P parameters from at least one of a first V2P device associated with a user or a second V2P device integrated with a vehicle associated with the user. Detecting a pedestrian state transition of the user based on the V2P parameters. The pedestrian state transition indicates at least one of a change in a classification of the user from a pedestrian state to a driver state or a change in the classification of the user from a driver state to a pedestrian state. Further, the method includes warning to at least one of the user or one or more entities in proximity to the user using the V2P parameters, the pedestrian state transition, and the vehicle parameters.

20 Claims, 15 Drawing Sheets

Related U.S. Application Data continuation of application No. 15/187,764, filed on Jun. 20, 2016, now Pat. No. 9,786,178, which is a continuation-in-part of application No. 14/450,097, filed on Aug. 1, 2014, now Pat. No. 9,421,909, and a continuation-in-part of application No. 14/566,562, filed on Dec. 10, 2014, now Pat. No. 9,505,412, which is a continuation-in-part of application No. 14/450,097, filed on Aug. 1, 2014, now Pat. No. 9,421,909.

(60) Provisional application No. 61/861,886, filed on Aug. 2, 2013.

(58) Field of Classification Search
USPC ..... 340/435, 436, 438; 701/36, 49, 300, 301
See application file for complete search history.

(56) References Cited

U.S. PATENT DOCUMENTS

| | | |
|---|---|---|
| 6,540,275 B1 | 4/2003 | Iwamoto et al. |
| 7,095,336 B2 | 8/2006 | Rodgers et al. |
| 7,271,736 B2 | 9/2007 | Siegel et al. |
| 7,202,776 B2 | 10/2007 | Breed |
| 7,375,622 B2 | 5/2008 | Takata |
| 7,576,639 B2 | 8/2009 | Boyles et al. |
| 7,629,899 B2 | 8/2009 | Breed |
| 7,630,806 B2 | 10/2009 | Breed |
| 7,852,462 B2 | 12/2010 | Breed et al. |
| 7,908,060 B2 | 3/2011 | Basson |
| 8,164,432 B2 | 4/2012 | Broggi et al. |
| 8,195,394 B1 | 5/2012 | Zhu et al. |
| 8,253,589 B2 | 8/2012 | Grimm et al. |
| 8,093,999 B2 | 10/2012 | Bauer et al. |
| 8,340,894 B2 | 12/2012 | Yester |
| 8,390,440 B2 | 3/2013 | Krautter |
| 8,509,523 B2 | 8/2013 | Schamp |
| 8,547,249 B2 | 10/2013 | David et al. |
| 8,594,370 B2 | 10/2013 | Schamp et al. |
| 2005/0149251 A1 | 7/2005 | Donath et al. |
| 2005/0194777 A1 | 9/2005 | Manwaring et al. |
| 2006/0015219 A1 | 1/2006 | Kynast et al. |
| 2007/0112513 A1* | 5/2007 | Mathevon .......... B60R 21/0136 701/301 |
| 2008/0231703 A1 | 9/2008 | Nagata et al. |
| 2008/0243389 A1* | 10/2008 | Inoue .................... G08G 1/165 701/301 |
| 2009/0018711 A1 | 1/2009 | Ueda et al. |
| 2009/0143987 A1 | 6/2009 | Bect et al. |
| 2009/0171536 A1* | 7/2009 | Zimmer .............. B60R 21/0134 701/49 |
| 2009/0279738 A1 | 11/2009 | Sasaki |
| 2010/0102972 A1 | 4/2010 | Middlekauff et al. |
| 2010/0305858 A1* | 12/2010 | Richardson ........ G06K 9/00785 701/301 |
| 2011/0090093 A1 | 4/2011 | Grimm et al. |
| 2011/0106376 A1 | 5/2011 | Tijerina et al. |
| 2011/0140968 A1 | 6/2011 | Bai et al. |
| 2011/0199199 A1 | 8/2011 | Perkins |
| 2011/0254703 A1 | 10/2011 | Li et al. |
| 2011/0288774 A1* | 11/2011 | Bengtsson ............... G08G 1/16 701/301 |
| 2011/0301802 A1 | 12/2011 | Rupp et al. |
| 2012/0016581 A1 | 1/2012 | Mochizuki |
| 2012/0025964 A1 | 2/2012 | Beggs et al. |
| 2012/0068859 A1 | 3/2012 | Mochizuki |
| 2012/0095646 A1 | 4/2012 | Ghazarian |
| 2012/0129544 A1 | 5/2012 | Hodis |
| 2012/0144346 A1 | 6/2012 | Meredith |
| 2012/0296603 A1 | 11/2012 | Kulik |
| 2012/0300078 A1 | 11/2012 | Ogata et al. |
| 2012/0303271 A1 | 11/2012 | Chowdhary |
| 2012/0008129 A1 | 12/2012 | Lu et al. |
| 2012/0323479 A1* | 12/2012 | Nagata ................... B60Q 9/008 701/301 |
| 2013/0029650 A1 | 1/2013 | Xiao et al. |
| 2013/0060400 A1 | 3/2013 | Hahne |
| 2013/0144490 A1 | 6/2013 | Lord |
| 2013/0184980 A1* | 7/2013 | Ichikawa ............... B25J 9/1676 701/301 |
| 2013/0187792 A1 | 7/2013 | Egly |
| 2014/0051346 A1 | 2/2014 | Lin et al. |
| 2014/0081521 A1 | 3/2014 | Fröjdh et al. |
| 2014/0085470 A1 | 3/2014 | Sako et al. |
| 2014/0112538 A1 | 4/2014 | Ogawa et al. |
| 2014/0125474 A1 | 5/2014 | Gunaratne |
| 2014/0142798 A1 | 5/2014 | Guarnizo Martinez et al. |
| 2015/0005981 A1 | 1/2015 | Grimm et al. |
| 2015/0035685 A1* | 2/2015 | Strickland ............... B60Q 9/008 340/901 |
| 2015/0153184 A1 | 6/2015 | Mudalige et al. |
| 2015/0229885 A1* | 8/2015 | Offenhaeuser ......... B60W 30/09 348/78 |
| 2015/0298693 A1 | 10/2015 | Uechi |
| 2015/0314783 A1* | 11/2015 | Nespolo ............. B60W 30/0953 701/301 |
| 2016/0114800 A1 | 4/2016 | Shimizu |

FOREIGN PATENT DOCUMENTS

| | | |
|---|---|---|
| JP | 2004046426 | 2/2004 |
| JP | 2004157847 | 6/2004 |
| JP | 2006209478 | 8/2006 |
| JP | 2008065482 | 3/2008 |
| JP | 2010264912 | 11/2010 |
| JP | 2013507691 | 3/2013 |
| WO | 2013112565 | 8/2013 |
| WO | 2014011556 | 1/2014 |

OTHER PUBLICATIONS

Office Action of Chinese Serial No. 201410524076.4 dated Jan. 17, 2018, 8 pages.

English translation of Office Action of Chinese Serial No. 201410524076.4 dated Jan. 17, 2018, 19 pages.

\* cited by examiner

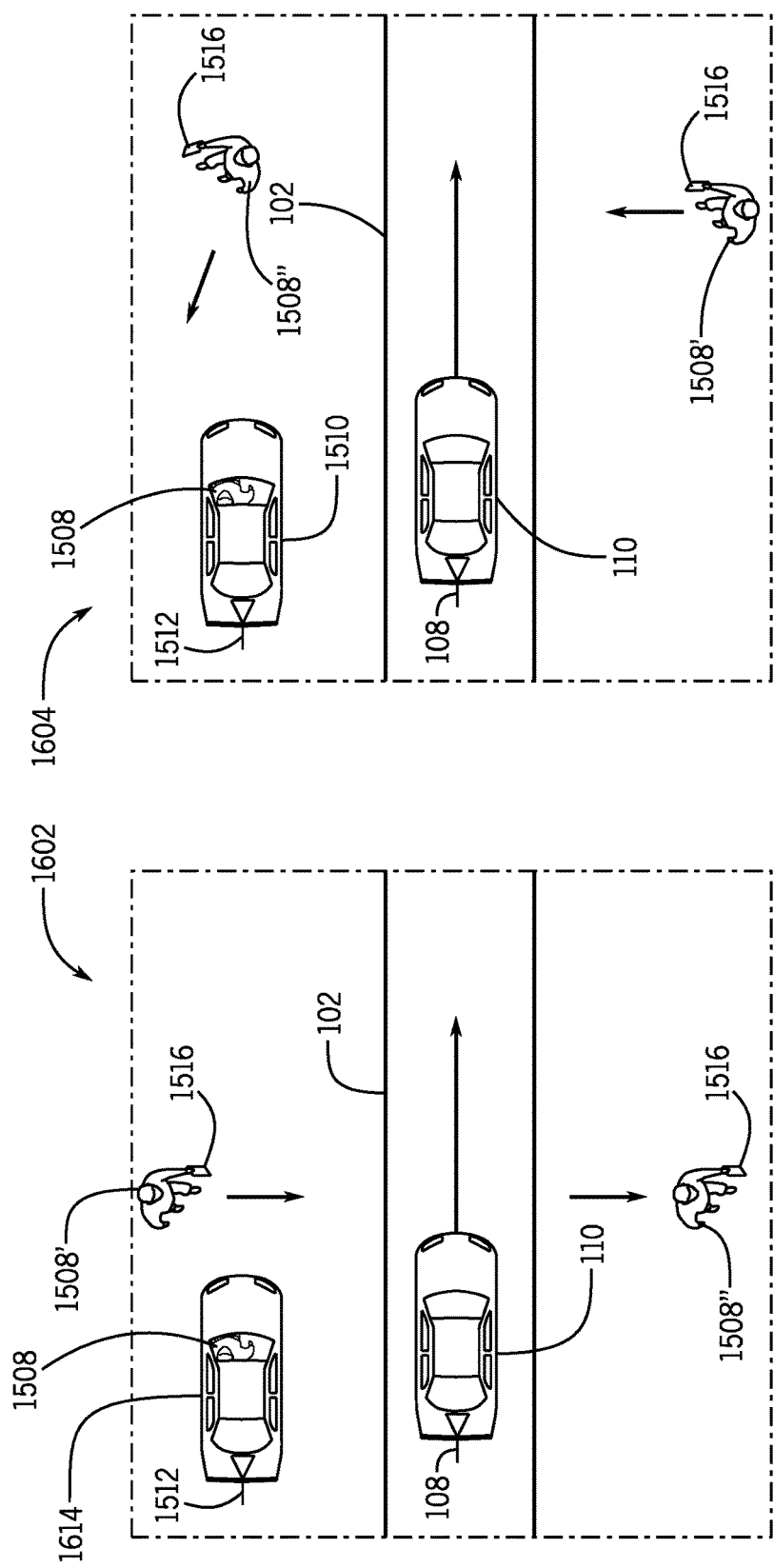

VEHICLE PEDESTRIAN SAFETY SYSTEM AND METHODS OF USE AND MANUFACTURE THEREOF

RELATED APPLICATIONS

This application is a continuation U.S. application Ser. No. 15/673,383 filed on Aug. 9, 2017, which is a continuation of U.S. application Ser. No. 15/187,764 filed on Jun. 20, 2016 and now issued as U.S. Pat. No. 9,786,178, both of which are expressly incorporated herein by reference. U.S. application Ser. No. 15/187,764 is a continuation-in-part of U.S. application Ser. No. 14/450,097 filed on Aug. 1, 2014, and now issued as U.S. as U.S. Pat. No. 9,421,909, which claims priority to U.S. Provisional Application Ser. No. 61/861,886 filed Aug. 2, 2013, both of which are expressly incorporated herein by reference.

U.S. application Ser. No. 15/187,764 is also a continuation-in-part of U.S. application Ser. No. 14/566,562 filed on Dec. 10, 2014, and now issued as U.S. Pat. No. 9,505,412, which is a continuation-in-part of U.S. application Ser. No. 14/450,097 filed on Aug. 1, 2014, and now issued as U.S. as U.S. Pat. No. 9,421,909, all of which are expressly incorporated herein by reference.

BACKGROUND

The travel of a vehicle along predetermined routes, such as on highways, roads, streets, paths, etc. (hereinafter generically referred to as paths) can be affected by other vehicles, objects, obstructions, and pedestrians (hereinafter generically referred to as Vulnerable Road User (VRU) on, at or otherwise in proximity to the path. The circumstances in which a vehicle's travel is affected can be numerous and diverse. Vehicle communication networks using wireless technology has the potential to address these circumstances by enabling vehicles to communicate with each other and with the infrastructure around them. Connected vehicle technology (e.g., Vehicle to Vehicle (V2V) and Vehicle to Infrastructure (V2I)) can alert motorists of roadway conditions or collisions. Connected vehicles could also "talk" to traffic signals, work zones, toll booths, school zones, and other types of infrastructure. Further, using either in-vehicle or after-market devices that continuously share important mobility information, vehicles ranging from cars to trucks and buses to trains would be able to "talk" to each other and to different types of roadway infrastructure. In addition to improving inter-vehicle communication, connected V2V and V2I applications have the potential to impact broader scenarios, for example, Vehicle to Pedestrian (V2P) communication.

SUMMARY

As one example of a V2P scenario, one or more pedestrians, disposed within a predefined distance of a subject vehicle, either walking, jogging, or stopped within or near a path of the subject vehicle, can cause or otherwise require the subject vehicle to stop or reduce its speed to avoid a collision. The immediacy of this requirement to stop or reduce speed is dictated by the location of the pedestrian relative to the path of the vehicle, a distance between the subject vehicle and the pedestrian, as well as the direction the pedestrian is heading (or predicted direction). It may also be necessary for the subject vehicle operator to observe other pedestrians near the vehicle path in order to maintain a safe distance. For example, a pedestrian suddenly entering a road or path of the subject vehicle can surprise the subject vehicle operator and create a dangerous scenario for the pedestrian and for other vehicles. The subject vehicle may thereby need to rapidly reduce speed or sharply swerve to avoid colliding with the pedestrian causing the subject vehicle to potentially collide with another vehicle.

In many of the above and other scenarios, it may be beneficial to determine whether a pedestrian is located within a predefined distance of the subject vehicle, and whether the pedestrian and the subject vehicle are separated by a safe or otherwise relevant distance. For example, if the pedestrian is too close to the path of the subject vehicle, then it may be beneficial to provide the subject vehicle with a warning to increase the distance separating the pedestrian from the subject vehicle, such as by a display the subject vehicle operator can readily view.

It may also be beneficial to collect and analyze data from the information disclosed above (such as with regard to a pedestrian potentially within the path of the subject vehicle) into account in addressing the above scenarios. For example, it may be particularly important to predict scenarios where the subject vehicle will need to reduce its speed, and to further reduce its speed slowly to avoid colliding with a pedestrian. Under these circumstances, the subject vehicle can predict whether the pedestrian may enter, or has already entered, a path of the subject vehicle, allowing the subject vehicle operator additional time to react to the pedestrian.

Accordingly, it may also be beneficial to combine real time or current pedestrian data with subject vehicle data using a data analysis system to generate actual and/or predicted vehicle movement and actual and/or predicted pedestrian movement to determine one or more levels of alerts or warnings to a vehicle operator as to the likelihood of a collision. For example, anticipated or mathematically derived movements of a pedestrian can be determined based on the real time data collected from one or multiple sources, and the relevance of these actual or predicted movements can be analyzed by a data analysis system in the subject vehicle.

It may also be beneficial to supplement the methods and apparatus for generating locations of pedestrians on or near a path of the vehicle, with methods and apparatus for detecting and/or analyzing information relating to pedestrians in a vicinity of a subject vehicle traveling on the path, such as a pedestrian moving towards a predicted path of the subject vehicle. An apparatus can include a control system that can include a processor-based controller to generate alerts or warnings to a subject vehicle operator and/or generate alerts or warnings to the subject pedestrian. For example, based on data received in messages from location-enabled devices carried by one or more pedestrians and operation data from the subject vehicle, the controller can generate a prediction that one or more of the pedestrians could potentially enter a predicted path of the subject vehicle, or conversely, that there is a potential for the subject vehicle to enter a predicted path of one of the pedestrians. The controller can generate a response to the effects of the pedestrian data and generate one or more visual and/or audible alerts or warnings to the operator of the subject vehicle. The alerts could inform the operator of the pedestrian location, warn of an impending collision, and/or provide an alert to hard brake the subject vehicle.

Thus, it may be beneficial to address at least one of the issues identified above. For example, it may be beneficial to facilitate operation of a V2P application in an in-vehicle controller that can network and communicate with remote devices (e.g., portable devices, wearable devices) associated with and/or worn by pedestrians. In addition, the above and/or other processes and configurations can be implemented in software and use a menu driven user interface in all of the contexts disclosed above including for each type of application. However, embodiments are intended to include or otherwise cover any other beneficial type of user interface for implementing the above applications, operations, configurations, etc. Some other embodiments are directed to a method of configuring a processor based computer system for enabling an implementer to install and configure a controller for deployment in a vehicle control system.

According to one embodiment, a computer-implemented method of operating a vehicle-to-pedestrian (V2P) communication system includes acquiring V2P parameters from at least one of a first V2P device associated with a user or a second V2P device integrated with a vehicle associated with the user. The method includes detecting a pedestrian state transition of the user based on the V2P parameters. The pedestrian state transition indicates at least one of a change in a classification of the user from a pedestrian state to a driver state or a change in the classification of the user from a driver state to a pedestrian state. Further, the method includes actuating a warning to at least one of the user or one or more entities in proximity to the user using the V2P parameters, the pedestrian state transition, and the vehicle parameters, where the warning indicates the pedestrian state transition.

According to another embodiment a vehicle-to-pedestrian (V2P) communication system includes at least one of a first V2P device associated with a user or a second V2P device integrated with a vehicle associated with the user, and a remote vehicle associated with a vehicle operator and including a V2V device operably connected for computer communication to the at least one of the first V2P device or the second V2P device. Further, the system includes a processor operably connected for computer communication to the remote vehicle and the at least one of the first V2P device or the second V2P device. The processor receives V2P parameters from the at least one of the first V2P device or the second V2P device and vehicle parameters from the remote vehicle. The processor detects a pedestrian state transition of the user based on the V2P parameters, by detecting a change in a classification of the user from a pedestrian state to a driver state or a driver state to a pedestrian state. The processor generates a warning to at least one of the first V2P device, the second V2P device or the remote vehicle using the V2P parameters, the pedestrian state transition, and the vehicle parameters, where the warning indicates the pedestrian state transition.

According to a further embodiment, a vehicle control system for use with a vehicle communications network, at least one source of V2P data about a user and about at least one of a first V2P device associated with the user or a second V2P device integrated with a vehicle associated with the user, and at least one source of vehicle data about one or more remote vehicles. The control system includes a processor that is configured to access the V2P data and the vehicle data, and detect a pedestrian state transition of the user based on the V2P data. The pedestrian state transition indicates at least one of a change in a classification of the user from a pedestrian state to a driver state or a change in the classification of the user from a driver state to a pedestrian state. The processor is also configured to determine a path of the user based on the V2P data and the pedestrian state transition, determine a path of the remote vehicle based on the vehicle data, and actuate a warning to a vehicle operator using the V2P data, the pedestrian state transition, and the vehicle data, where the warning indicates the pedestrian state transition.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing Figures are not necessarily drawn to scale and certain Figures may be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

FIG. 16A is an overhead view of the illustrative example of a driver to pedestrian transition shown in FIG. 15A according to an exemplary embodiment.

FIG. 16B is an overhead view of the illustrative example of a driver to pedestrian transition shown in FIG. 15B according to an exemplary embodiment.

DETAILED DESCRIPTION OF EXEMPLARY EMBODIMENTS

Figure 1:
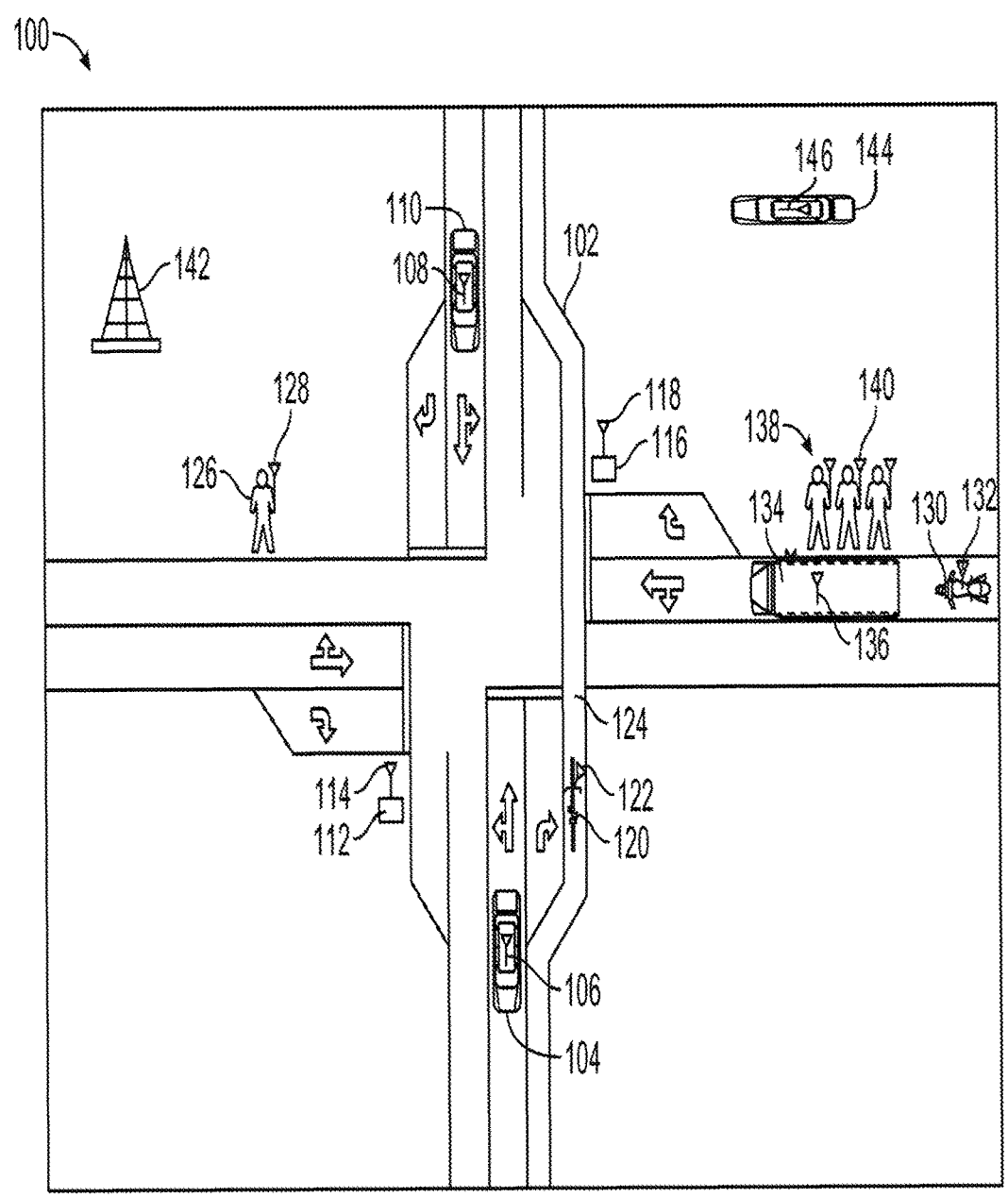
FIG. 1 is a schematic of a traffic scenario that involves V2X connected vehicles, pedestrians, and other entities at an intersection.

The following includes definitions of selected terms employed herein. The definitions include various examples and/or forms of components that fall within the scope of a term and that can be used for implementation. The examples are not intended to be limiting. Further, the components discussed herein, can be combined, omitted or organized with other components or organized into different architectures.

"Bus," as used herein, refers to an interconnected architecture that is operably connected to other computer components inside a computer or between computers. The bus can transfer data between the computer components. The bus can be a memory bus, a memory processor, a peripheral bus, an external bus, a crossbar switch, and/or a local bus, among others. The bus can also be a vehicle bus that interconnects components inside a vehicle using protocols such as Media Oriented Systems Transport (MOST), Processor Area network (CAN), Local Interconnect network (LIN), among others.

"Component", as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) can reside within a process and/or thread. A computer component can be localized on one computer and/or can be distributed between multiple computers.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

"Computer-readable medium," as used herein, refers to a non-transitory medium that stores instructions and/or data. A computer-readable medium can take forms, including, but not limited to, non-volatile media, and volatile media. Non-volatile media can include, for example, optical disks, magnetic disks, and so on. Volatile media can include, for example, semiconductor memories, dynamic memory, and so on. Common forms of a computer-readable medium can include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Database," as used herein, is used to refer to a table. In other examples, "database" can be used to refer to a set of tables. In still other examples, "database" can refer to a set of data stores and methods for accessing and/or manipulating those data stores. A database can be stored, for example, at a disk and/or a memory.

"Disk," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

"Input/output device" (I/O device) as used herein can include devices for receiving input and/or devices for outputting data. The input and/or output can be for controlling different vehicle features which include various vehicle components, systems, and subsystems. Specifically, the term "input device" includes, but it not limited to: keyboard, microphones, pointing and selection devices, cameras, imaging devices, video cards, displays, push buttons, rotary knobs, and the like. The term "input device" additionally includes graphical input controls that take place within a user interface which can be displayed by various types of mechanisms such as software and hardware based controls, interfaces, touch screens, touch pads or plug and play devices. An "output device" includes, but is not limited to: display devices, and other devices for outputting information and functions.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry can include and/or be a part of a processor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

"Memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory can store an operating system that controls or allocates resources of a computing device.

"Operable connection," or a connection by which entities are "operably connected," is one in which signals, physical communications, and/or logical communications can be sent and/or received. An operable connection can include a wireless interface, a physical interface, a data interface, and/or an electrical interface.

"Module", as used herein, includes, but is not limited to, non-transitory computer readable medium that stores instructions, instructions in execution on a machine, hardware, firmware, software in execution on a machine, and/or combinations of each to perform a function(s) or an action (s), and/or to cause a function or action from another module, method, and/or system. A module can also include logic, a software controlled microprocessor, a discrete logic circuit, an analog circuit, a digital circuit, a programmed logic device, a memory device containing executing instructions, logic gates, a combination of gates, and/or other circuit components. Multiple modules can be combined into one module and single modules can be distributed among multiple modules.

"Portable device", as used herein, is a computing device typically having a display screen with user input (e.g., touch, keyboard) and a processor for computing. Portable devices include, but are not limited to, handheld devices, mobile devices, smart phones, laptops, tablets and e-readers.

"Processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multicore processors and co-processors and other multiple single and multicore processor and co-processor architectures. The processor can include logic circuitry to execute actions and/or algorithms.

"Vehicle," as used herein, refers to any moving vehicle that is capable of carrying one or more human occupants and is powered by any form of energy. The term "vehicle" includes, but is not limited to automobiles, cars, trucks, vans, minivans, SUVs, buses, recreational vehicles, motorcycles, scooters, mopeds, ATVs, trams, golf-carts, go-karts, amusement ride cars, rail transport, personal watercraft, boats, ships, robotically controlled vehicles, automated drive vehicles, remote controlled vehicles, drones, aircraft, helicopters, any type of mode of transport that can travel along or in proximity to a path or route, or any other transport related entity. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle can carry one or more human occupants. Further, the term "vehicle" can include vehicles that are automated or non-automated with pre-determined paths or free-moving vehicles.

"Vehicle display", as used herein can include, but is not limited to, LED display panels, LCD display panels, CRT display, plasma display panels, touch screen displays, among others, that are often found in vehicles to display information about the vehicle. The display can receive input (e.g., touch input, keyboard input, input from various other input devices, etc.) from a user. The display can be located in various locations of the vehicle, for example, on the dashboard or center console. In some embodiments, the display is part of a portable device (e.g., in possession or associated with a vehicle occupant), a navigation system, an infotainment system, among others.

"Vehicle control system" and/or "vehicle system," as used herein can include, but is not limited to, any automatic or manual systems that can be used to enhance the vehicle, driving, and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, an interior or exterior camera system among others.

A few inventive aspects of the disclosed embodiments are explained in detail below with reference to the various Figures. Exemplary embodiments are described to illustrate the disclosed subject matter, not to limit its scope, which is defined by the claims. Those of ordinary skill in the art will recognize a number of equivalent variations of the various features provided in the description that follows.

I. Network Environment for a Vehicle

Vehicle applications for pedestrians can be useful to implement with connected vehicle (V2X or Vehicle-to-Everything) technology. This technology, generally referred to as V2X communications, can include communications among vehicles and to or from other entities on or nearby the roadway. V2X technology can have various applications beneficial to enhancing vehicular operations, roadways, and mobility. The vehicle communication technology discussed herein, including V2V, V2I, and V2X technology, is intended to be implemented with any known, related art or later developed technologies. For example, some embodiments can be implemented using Dedicated Short Range Communications (DSRC) networks (including but not limited to those types of networks currently used by some transport and traffic systems, such as for automatic toll collection), ad hoc networks, wireless access in vehicular environments (WAVE), cellular networks, Wi-Fi networks, and/or any other network protocol that can provide the desired functionalities.

The examples and embodiments discussed herein are in the context of a DSRC network, which is a short to medium range communications service that provides communications links with high data transfer rates with acceptable or minimal latency. However, the embodiments intend to include or otherwise cover the use of other networks and wireless communication standards. Vehicles, users, and infrastructure equipped with DSRC systems may communicate with each other, with remote DSRC compatible transceivers over a network, or with roadside equipment (such as transport related infrastructure). The range of DSRC is typically about 300 meters, with some systems having a maximum range of about 1000 meters. DSRC in the United States typically operates in the 5.9 GHz range, from about 5.85 GHz to about 5.925 GHz, and the typical latency for DSRC is about 50 ms. Some DSRC systems communicate with vehicles operating at 100 miles per hour or less, but embodiments are intended to cover communications with vehicles traveling at any speed.

Connected vehicle systems and V2V and V2I applications using DSRC rely on the Basic Safety Message (BSM), which is one of the messages defined in the Society of Automotive standard J 2735, DSRC Message Set Dictionary, November 2009. The BSM is broadcast from vehicles over the 5.9 GHz DSRC band. Transmission range is on the order of 1,000 meters. The BSM consists of two parts (Table 1). BSM Part 1 contains core data elements, including vehicle position, heading, speed, acceleration, steering wheel angle, and vehicle size and is transmitted at an adjustable rate of about 10 times per second. BSM Part 2 contains a variable set of data elements drawn from an extensive list of optional elements. They are selected based on event triggers (e.g., ABS activated) and are added to Part 1 and sent as part of the BSM message, but are transmitted less frequently in order to conserve bandwidth. The BSM message includes only current snapshots (with the exception of path data which is itself limited to a few second's worth of past history data). As will be discussed in further detail herein, it is understood that any other type of V2X messages can be implemented, and that V2X messages can describe any collection or packet of information and/or data that can be transmitted between V2X communication devices. Further, these messages be in different formats and include information and/or data other than as shown in Table 1.

TABLE 1

| BSM Part 1 | BSM Part 2 |
| --- | --- |
| Position (local 3D):<br>Latitude<br>Longitude<br>Elevation<br>Positional accuracy | Road coefficient of friction |
| Motion:<br>Transmission state<br>speed<br>heading | Rain sensor/precipitation sensor |
| Steering wheel angle<br>Acceleration Set (4-way):<br>this includes 3 axes of<br>acceleration plus yaw rate | Traction Control System active over 100 msec |
| Vehicle size | Antilock Brake System active over 100 msec<br>Lights changed and Exterior lights (status)<br>Wipers changed and wiper status<br>Ambient air temperature<br>Ambient air pressure<br>Vehicle type |

Exemplary V2P communication systems and methods will now be described with reference to FIG. 1, a schematic view of an exemplary traffic scenario that involves network connected vehicles, pedestrians, and other entities at an intersection is shown. A traffic scenario 100 can include, but is not limited to, V2X connected vehicles, pedestrians, and any other vulnerable road units (VRUs) on or off a road or path. Various users, entities, and vehicle communication network components can be disposed at or proximate the disclosed intersection 102, including a host vehicle 104, a remote vehicle 110, road side equipment (RSE) 112 and 116, a bicycle 120, a pedestrian 126, a school bus 134, a group of pedestrians 138, a motorcycle 130, and a remote vehicle 144, which can be associated with the pedestrian 126. In addition, FIG. 1 shows a cellular network antenna 142 for use with an extended vehicle communication network that can transmit DSRC signals over a modulated carrier. It is understood that the above users, entities, and components are merely provided for exemplary purposes to facilitate explanation of the disclosed vehicle communication network, and alternative or additional features may be provided.

The host vehicle 104 can transmit, receive and/or exchange communications including data, images, messages (e.g., BSM messages, V2X messages, V2P messages, V2V messages), and other information with other vehicles and entities using a DSRC network, which can be implemented with DSRC compatible transceivers, such as V2X compatible transceivers. "V2X" is used in the present disclosure to cover "vehicle-to-everything" communications, and variations of V2X designations may depend on the intended user that is transmitting V2X signals. For example, V2V, V2M (Vehicle to Motorcycle), and V2P (Vehicle to Pedestrian) technologies can advantageously provide a warning to a driver of a potential collision with other V2X-enabled entities, such as a remote vehicle (car, truck, motorcycle) or a pedestrian. V2X applications can also beneficially warn a driver of certain roadway scenarios that can include but are not limited to a remote vehicle in a same lane performing a hard brake, a remote vehicle swerving or losing control in the same vicinity as the host vehicle, a remote vehicle merging into the same lane as the host vehicle, tailgating, etc. In another example, V2I technology can beneficially warn a driver of a red light violation, over-speeding in a curve, an upcoming work zone or lane closure, severe weather conditions, etc. V2X software applications that can be installed in an on-board Controller are available for implementers to select from for deployment.

Each V2X compatible entity can receive and/or exchange messages with any or all other V2X compatible entities. Components of V2X devices can exchange messages, warnings and alerts, and/or other useful information between V2X users. As an example, a host vehicle V2V transceiver 106 may exchange messages with a V2V transceiver 108 installed in remote vehicle 110 and/or with a V2P transceiver 128 carried by the pedestrian 126. As another example, a remote vehicle V2V transceiver 146 associated with the pedestrian 126 can exchange messages with the pedestrian transceiver 128 (e.g., implemented within a portable device), and the remote vehicle V2V transceiver 146 associated with the pedestrian 126 and/or the pedestrian transceiver 128 can exchange messages with the V2V transceiver 106 of the host vehicle 104 and/or the V2V transceiver 108 of the remote vehicle 110.

As discussed in detail above, V2X messages can describe any collection or packet of information and/or data that can be transmitted between V2X communication devices. Messages may take the form of basic safety messages (e.g., Table 1) and/or may contain more information than basic safety messages, such as entity location data, movement data, identification, commands that can control another vehicle's automated driving system, etc. V2X messages may include any number of bytes of information or data. In some embodiments, the V2V transceiver 106 is intended to be used with one or more vehicle safety systems. Examples of vehicle safety systems include, but are not limited to, collision warning systems, lane departure warning systems, integrated vehicle-based safety systems, automatic guided vehicle systems, other types of safety systems, etc. For example, the information may be useful for a particular vehicle in order to warn a vehicle or broadcast a warning to a group of V2X users in the traffic scenario 100. For example, the host vehicle 104 can include a collision warning system that can receive and assess safety information and data.

In other embodiments, the host vehicle 104 may exchange information between one or more V2X compatible entities. For example, the host vehicle 104 V2V transceiver 106 and remote vehicle V2V transceiver 108 may be configured to exchange vehicle information that can include, but is not limited to, the type of user or vehicle, navigation data, road hazard data, collision warning data, course heading data, course history data, projected course data, kinematic data, current position data, range or distance data, speed and acceleration data, location data, vehicle sensory data, vehicle subsystem data, and/or any other vehicle information. In various embodiments, the host vehicle 104 may exchange information using V2X protocols with any number of vehicles, pedestrians, or any other V2X users with an operational V2X transceiver. For example, the host vehicle 104, remote vehicle 110, motorcycle 130, and school bus 134 may be configured to exchange information over V2X protocols with road side equipment 112 over V2I transceiver 114 protocols, and road side equipment 116 over V2I transceiver 118 using V2I protocols.

In another example, the school bus 134 can broadcast DSRC alert messages to all other vehicles at intersection 102 via V2VP transceiver 136 that school children are offloading at a bus stop, and the group of pedestrians 138 (school children) carrying V2P transceivers 140 can broadcast alert messages with their location to all vehicles in the intersection 102. In another example, FIG. 1 also shows a bicycle lane 124 along which the bicycle 120 can travel while transmitting V2B messages containing the bicycle's location, speed, and heading to the host vehicle 104 using a V2B transceiver 122. Similarly, the motorcycle 130 can travel through intersection 102 while transmitting V2M messages containing the motorcycle's location using a V2M transceiver 132.

In a further example, which will be discussed in more detail herein, the V2P communication system can be applied to detect a pedestrian state transition (e.g., from a pedestrian state to a drive state, or from a driver state to a pedestrian state) or a pedestrian cross-street transition, thereby indicating an intent of the pedestrian 126 to cross the intersection 102. The V2P transceiver 128 associated with the pedestrian 126 or the V2V transceiver 146 associated with the remote vehicle 144 where the remote vehicle is also associated with the pedestrian 126 can broadcast DSRC alert messages to all other vehicles at intersection 102 to warn the vehicles to prepare for a possible pedestrian state transition and/or the possibility of a roadway crossing (e.g., across intersection 102).

II. In-Vehicle Controller System

Figure 2:
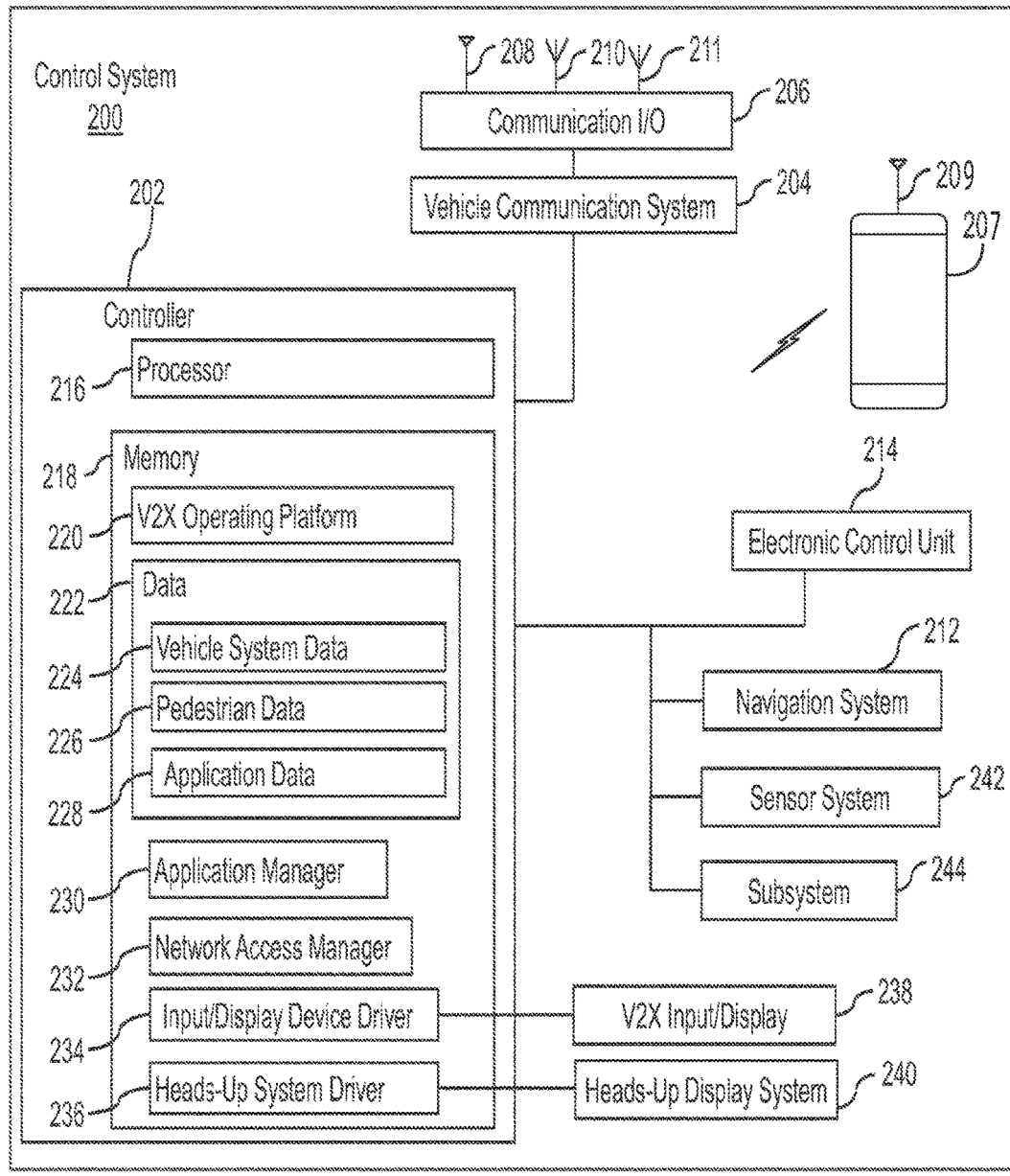
FIG. 2 is a schematic of a V2X control system according to the disclosed subject matter.

FIG. 2 is a schematic of a control system 200 according to the disclosed subject matter. The control system 200 may be separate systems and devices from, but operationally connected to, a controller 202. The host vehicle 104 may include a vehicle communication system 204 connected to a communication input/output 206, which can include, but is not limited to, a cellular communication transceiver 208, a Wi-Fi communication transceiver 210, and a short-range communication transceiver 211.

The controller 202 can include a processor 216, a memory 218, and other components typically present in general or special purpose computers. In some embodiments, the onboard controller 202 may include programmable logic circuits and/or pre-configured logic circuits for executing V2X functions. The memory 218 can store information accessible by the processor 216 including a V2X operating platform 220 and data 222 that may include instructions that may be executed or otherwise used by the processor 216. The control logic (in this example, software instructions or computer program code), when executed by the processor 216, causes the processor 216 to perform the functions of the embodiments as described herein. The memory 218 may be of any type capable of storing information accessible by the processor, including a computer-readable medium, or other medium that stores data that may be read with the aid of an electronic device, such as a hard-drive, flash drive, memory card, ROM, RAM, DVD or other optical disks, as well as other write-capable and read-only memories. Systems and methods may include different combinations of the foregoing, whereby different portions of the V2X operating platform 220 and data 222 are stored on different types of media.

The onboard controller 202 may include all of the components normally used in connection with a computer, such as a central processing unit (CPU) (e.g. processor 216), a memory 218 (e.g., RAM and internal hard drives) storing data 222 and a V2X operating platform 220, a communicator/annunciator such as a V2X input/display 238 (e.g., a monitor having a screen, a small LCD touch-screen or any other electrical device that is operable to display and/or audibly playout information) configured by an input/display device driver 234, and/or a user input device (e.g., a mouse, keyboard, touch screen, camera, scanner, and/or microphone). The controller 202 can also be include a heads-up system driver 236 that can configure a heads-up display system 240 that can be configured to receive user input and/or display information and alerts from V2X applications. In some embodiments, a remote device (e.g., a portable device 207) can function as the V2X input/display 238 and be configured to receive user input and/or display information and alerts from V2X applications. It will be understood that, although various systems and the controller 202 are shown within host vehicle 104, these elements may be external to the host vehicle 104 and/or physically separated by large distances.

The V2X operating platform 220 may be any set of instructions to be executed directly (such as machine code) or indirectly (such as scripts) by the processor 216. For example, the V2X operating platform 220 may be stored as computer code on the computer-readable medium. In this regard, the terms "instructions" and "programs" may be used interchangeably herein. The V2X operating platform 220 may be stored in object code format for direct processing by the processor 216, or in any other computer language including scripts or collections of independent source code modules that are interpreted on demand or compiled in advance. Functions, methods and routines of the V2X operating platform 220 are explained in more detail below.

Data 222 may be retrieved, stored or modified by the processor 216 in accordance with the V2X operating platform 220. For instance, although the system is not limited by any particular data structure, the data 222 may be stored in computer registers, in a relational database as a table having a plurality of different fields and records, XML documents, flat files, etc. The data 222 may also be formatted in any computer-readable format. The data 222 may include any information sufficient to identify the relevant information, such as numbers, descriptive text, proprietary codes, references to data stored in other areas of the same memory or different memories (including other network locations) or information that is used by a function to calculate the relevant data. Data 222 can include, but is not limited to, vehicle system data 224, pedestrian data 226, and application data 228. The controller 202 can also include specialized components or instructions not normally associated with general purpose computers, such as an application manager 230 that can store, track, and control versions and updates for V2P applications, and a network access manager 232 that controls and saves configurations for the vehicle communication system 204 to communicate with other V2X devices via a DSRC network.

The vehicle system data 224 can include, but is not limited to, navigation data such as latitude, longitude, and heading, speed, yaw, wheel angle, longitudinal acceleration, brake actions, a number of pedestrians in front of the host vehicle 104, and calculations regarding the headings of both the host vehicle 104 and pedestrians. Pedestrian data 226 can include pedestrian identification, location data such as latitude, longitude, and heading, speed, distance from the host vehicle 104, a relative position and relative direction. Pedestrian data can be received in DSRC VRU communication messages received from V2P devices. For example, the processor 216 can decode, log, and use new VRU awareness messages DSRC communications to use for V2P collision avoidance application data 228. The VRU awareness messages can include identification such as a road worker, a status such as running or walking, etc. The VRU awareness messages can be transmitted by V2P transceiver 128 and received by the vehicle communication system 204, decoded by processor 216, and shared in the pedestrian data 226 for subsequent coding.

The processor 216 may be any known, related art or later developed processor. Alternatively, the processor may be a dedicated device, such as an ASIC (application-specific integrated circuit), DSP (digital signal processor), etc. Although FIG. 2 illustrates the processor 216, memory 218, and other elements of controller 202 as being within the same block, it will be understood by those of ordinary skill in the art that the processor 216 and memory 218 may actually include multiple processors and memories that may or may not be stored within the same physical housing. For example, memory 218 may be a hard drive or other storage media located in a housing that is different from that of the controller 202. Accordingly, references to a processor or computer will be understood to include references to a collection of processors, computers or memories that may or may not operate in parallel. Rather than using a single processor 216 to perform the steps described herein, some of the components, for example the vehicle communication system 204 can send data and information to processor 216 or have its own processor that can perform its own operations. In an alternative embodiment, the processor 216 may be located remote from the host vehicle 104 and communicate with the vehicle wirelessly through a separate communication system. Other in-vehicle systems associated with some vehicles implemented with V2X-compatible controllers may include different elements and/or arrangements as configured for controller 202, but may be configured to operate similar to, and be compatible with, the controller 202.

The vehicle communication system 204 may include the communication input/output (I/O) 206 that can be used to control radio transmissions between the vehicle communication system 204 and external receivers for DSRC and/or Internet communications using a cellular communication transceiver 208, a Wi-Fi communication transceiver 210, and a short-range communication transceiver 211 (e.g., a Bluetooth® transceiver). The network communications can be operated by a network access manager 232. While the communication I/O 206 and the vehicle communication system 204 are shown as part of the V2X control system 200 in FIG. 2, it is understood these devices may separate from the V2X control system 200.

The controller 202 may be capable of communicating with various components of the host vehicle 104 including the electronic control unit (ECU) 214, which controls one or more vehicle processes and systems relevant to operation of the host vehicle 104. The data 222 can also be gathered from host vehicle sensor system 242 or subsystem 244 or via the ECU 214 controlling one or more host vehicle sensor system 242 or subsystem 244. Other data from the vehicle subsystem 244 and the vehicle sensor system 242 can include, but is not limited to, braking, accelerator pedal movement, throttle movement, fuel level, a rotational speed of an engine, engine temperature, camera images, radar sensor data, etc. Vehicle navigation images and data may be received by controller 202 from a vehicle navigation system 212 via a direct communication link or through the ECU 214. The vehicle navigation system 212 may include a separate navigation system computer system and display or alternatively may share the V2X input/display 238.

In FIG. 2, the controller 202 may be capable of communicating with a portable device 207, which in some embodiments discussed herein, can be associated with the pedestrian 126. The portable device 207 can be a wearable device and/or a remote device associated with and/or worn by the pedestrian 126. The portable device 207 can wirelessly connect and/or communicate with the controller 202 using wireless technologies. The V2P transceiver 128 can be integrated with the portable device 207. Thus, as shown in FIG. 2, the portable device 207 includes a V2P transceiver 209. Thus, the portable device 207 can transmit V2P messages and/or receive V2V, V2X, and/or V2I messages using, for example, the V2P transceiver 209. In particular, the portable device 207 can be in communication with the remote vehicle 144 via the V2V transceiver 146, which can be associated with the pedestrian 126.

Although not shown, the portable device 207 can include one or more of the components of the controller 202. For example, the portable device 207 can also execute V2P applications and store data as discussed above. Additionally, the remote vehicle 110 and the remote vehicle 144 can also include one or more of the components of the controller 202. In particular, in some embodiments, the V2V transceiver 108 and/or the V2V transceiver 146 can be referred to as a V2V device or a V2P device.

III. Vehicle Interior

Figure 3:
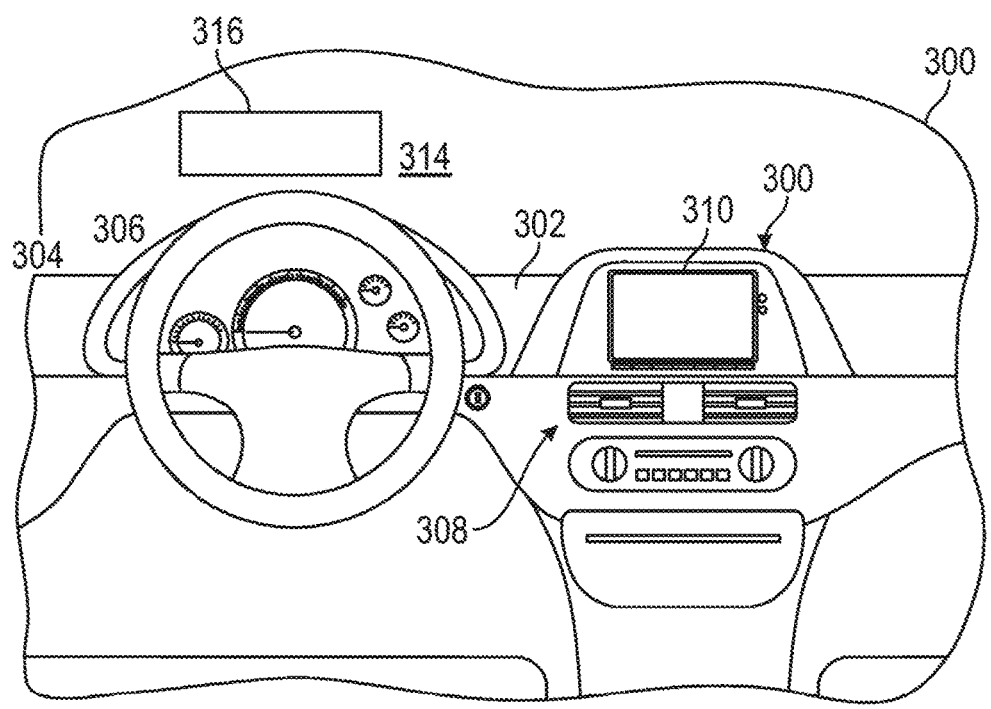
FIG. 3 is a schematic of an exemplary design of a vehicle interior including a display device with which an embodiment may operate.

FIG. 3 is a schematic of an exemplary design of a vehicle interior including a display device with which an embodiment may operate. In FIG. 3, a vehicle interior 300 may include, for example, a dashboard 302, a steering apparatus such as a steering wheel 304, an instrument panel 306, and a center portion 308. Center portion 308 can include one or more input devices including but not limited to audio devices, video devices, portable consumer device docking stations or USB ports, as well as any other types of input devices. In addition, center portion 308 can be associated with controls for one or more systems of host vehicle 104 including, but not limited to: climate control systems, radio and sound systems, and other types of systems. The vehicle interior 300 may also include a display panel 310 (that can function as the V2X input/display 238), for displaying information from the controller 202, and/or other related or unrelated vehicle systems such as vehicle navigation system 212. Further, as mentioned above, in some embodiments the portable device 207 can include a display and function as the V2X input/display 238.

Examples of the display panel 310 include, but are not limited to, LCDs, CRTs, ELDs, LEDs, OLEDs, or electronic paper displays. The display panel 310 may also function as the V2X input/display 238 for activating or deactivating one or more applications of the controller 202 and selecting V2X software application update configurations. The display panel 310 can include buttons, a keypad, voice-activated controls received through a microphone or other types of user input technology on and around center dashboard 312. In an embodiment, a heads-up display 316 can be included as the viewing area of the heads-up display system 240 to display information and images on one or more surfaces that can be easily viewed by a vehicle operator. In an alternative embodiment, the heads up display 316 could be configured as a projection onto other surfaces, such as the windshield 314. In some embodiments, the heads-up display 316 can be located in any portion of vehicle interior 300, or alternatively can be a portable electronic device (e.g., the portable device 207) that can wirelessly connect to the controller 202. Additionally, the heads up display 316 can be installed in other areas of interior 300 such as the instrument panel 306 or in multiple displays such as anterior to a passenger seat headrest (not shown).

In addition, while display panel 310 can be configured to present visual information for the controller 202, the display panel 310 can be shared with other devices or systems within host vehicle 104 such as vehicle navigation system 212, vehicle communication system 204, instrument panel 306 etc. or a compatible computer system in another vehicle.

IV. Method of Operation

Figure 4:
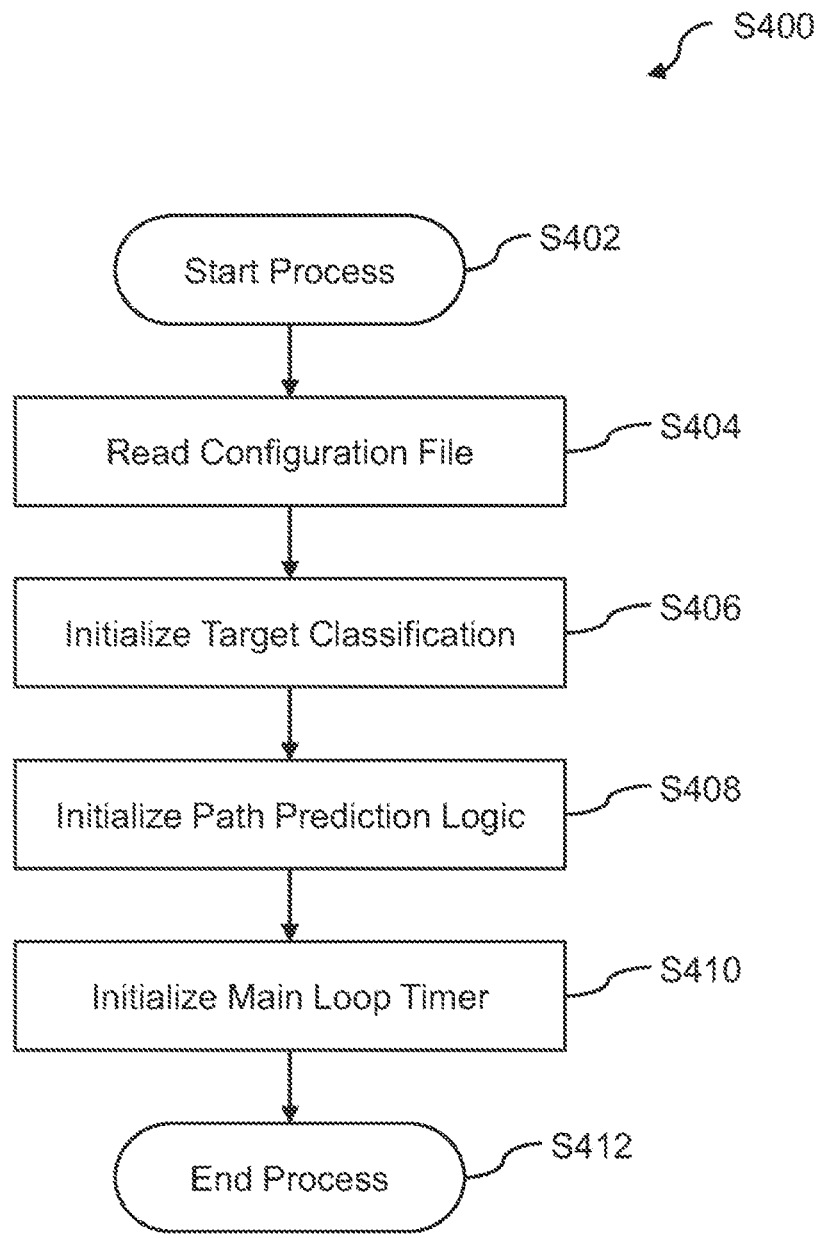
FIG. 4 is a flowchart of an exemplary logic process or algorithm for a vehicle to pedestrian cooperative safety application.

FIG. 4 is a flowchart of an exemplary logic process or algorithm S400 for a vehicle to pedestrian cooperative safety application. The embodiments can provide a process by which the controller 202 can transmit messages (e.g., BSM, V2V message, V2P messages) and can receive Vulnerable Road User (VRU) awareness messages from a V2P transceiver 128 over DSRC channel(s). The controller 202 can analyze location data of VRUs on or near the path of the host vehicle 104 and alert the vehicle operator of VRUs, predict a potential collision threat and, based on the level of the threat, inform, warn, or alert a driver of the host vehicle 104. Contemporaneously, the V2P transceiver 128 can compute a collision threat of the host vehicle 104 and provide a warning to the pedestrian 126. The controller 202 can start the process S400 at step S402. The controller 202 can then proceed to step S404.

At step S404, the controller 202 can read a configuration file for a V2P collision avoidance application in the application manager 230. At step S406 the controller 202 can initialize target classification logic for the V2P application. The target classification logic can determine a relative position and heading of a pedestrian with respect to a predicted path of the host vehicle 104. At step S408 the controller 202 controller can initialize path prediction logic. The path prediction logic can analyze the vehicle system data 224 and predict a path of the host vehicle 104. The path prediction logic can also analyze pedestrian data 226 and predict a path of a pedestrian. At step S410 the controller 202 can initialize the main loop timer, which can be a time between executions of the main loop logic by the controller 202 used for gathering pedestrian data 226 and vehicle system data 224. The process 400 can end at step S412. The subroutines executing the process initializing steps S404, S406, S408 and S410 are described further as the exemplary methods in FIG. 5

Figure 5:
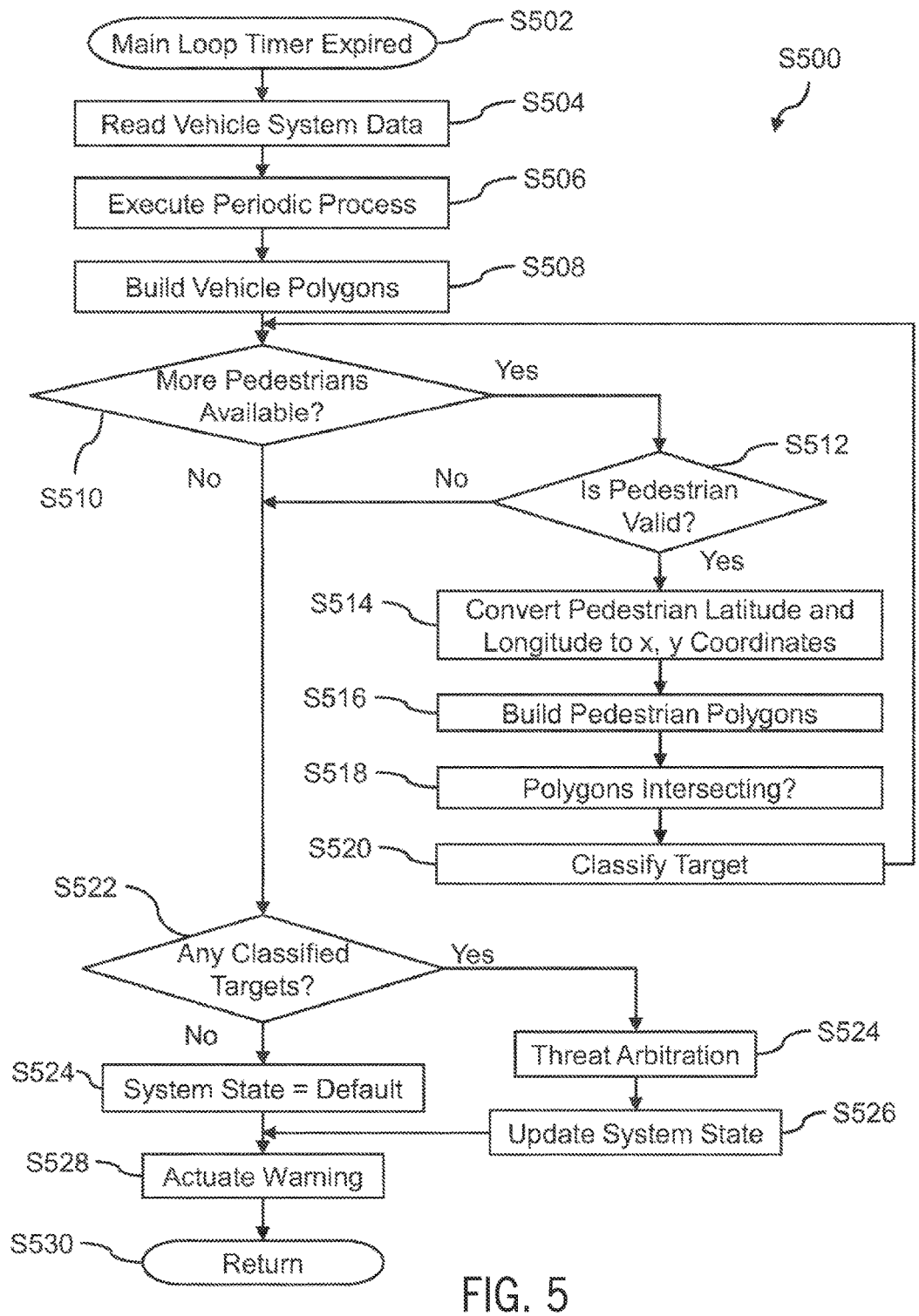
FIG. 5 is a flowchart of an exemplary process for determining a vehicle collision threat with a pedestrian according to the disclosed subject matter.

FIG. 5 is a flowchart of an exemplary process for determining a vehicle collision threat with a pedestrian according to the disclosed subject matter. The controller 202 can start the process S500 at step S502, where the main loop timer expired. In one embodiment, the main timer loop could be 100 ms. However the main loop timer delay is merely exemplary and the embodiments intend to include or otherwise cover time loops of more or less than 100 ms. The controller 202 can then proceed to step S504.

At step S504, the controller 202 can read the vehicle system data 224 from the data 222 in the memory 218. In other embodiments, the controller 202 can receive the vehicle system data 224 directly from the ECU 214 or vehicle sensor system 242, thereby bypassing memory 218. The controller 202 can also read vehicle system data received from the navigation system 212, which can include vehicle latitude, longitude, heading, etc. from a GPS module or other navigation module or application. At step S506 the controller 202 can execute a periodic process, which can process vehicle data such as yaw curve data from a low pass filter and compare the filtered radius of a curve to a calculated radius. At step S508, the controller 202 can execute a process to build vehicle polygons in order to provide a path prediction of the host vehicle 104. The process to build vehicle polygons can use a hardcoded number of polygons to represent a predicted path of the vehicle 104. This process is further disclosed in regard to FIG. 6.

Figure 8:
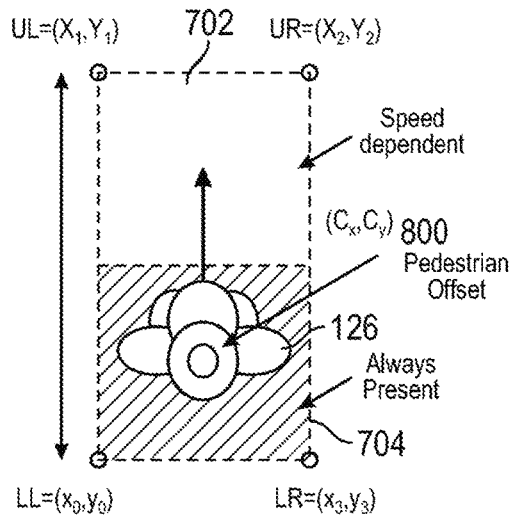
FIG. 8 is a schematic defining a pedestrian predicted path polygon according to the disclosed subject matter.
Figure 9:
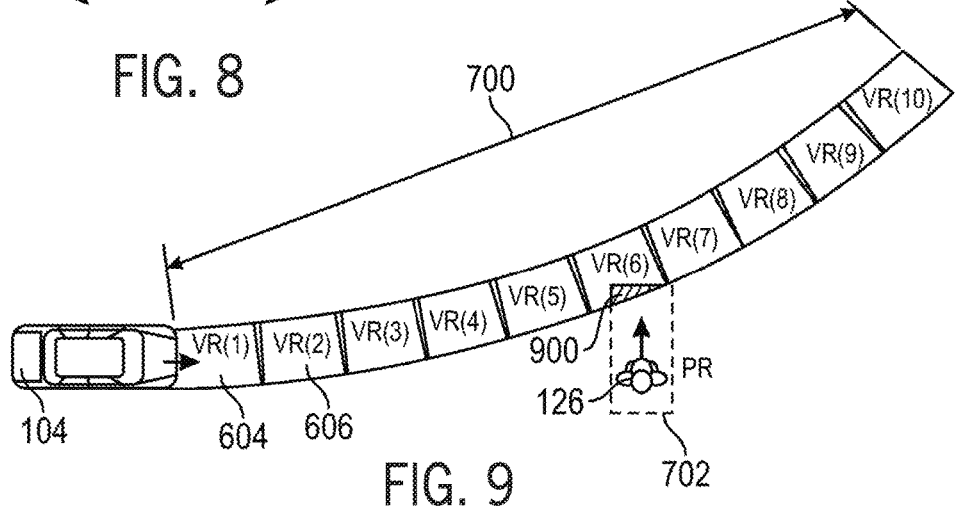
FIG. 9 is a schematic of vehicle and pedestrian predicted path polygons intersecting according to the disclosed subject matter.
Figure 10:
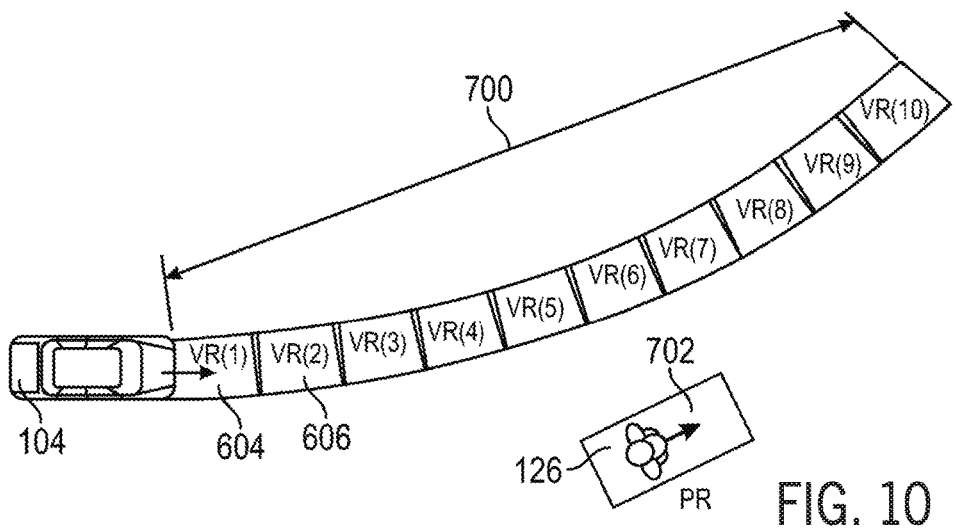
FIG. 10 is a schematic of vehicle and pedestrian predicted path polygons not intersecting according to the disclosed subject matter.
Figure 11:
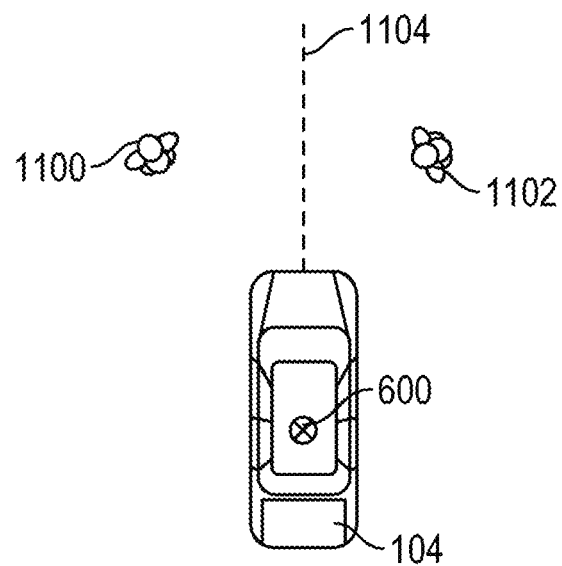
FIG. 11 is a schematic of a relative position of a pedestrian with respect to a vehicle predicted path according to the disclosed subject matter.
Figure 12:
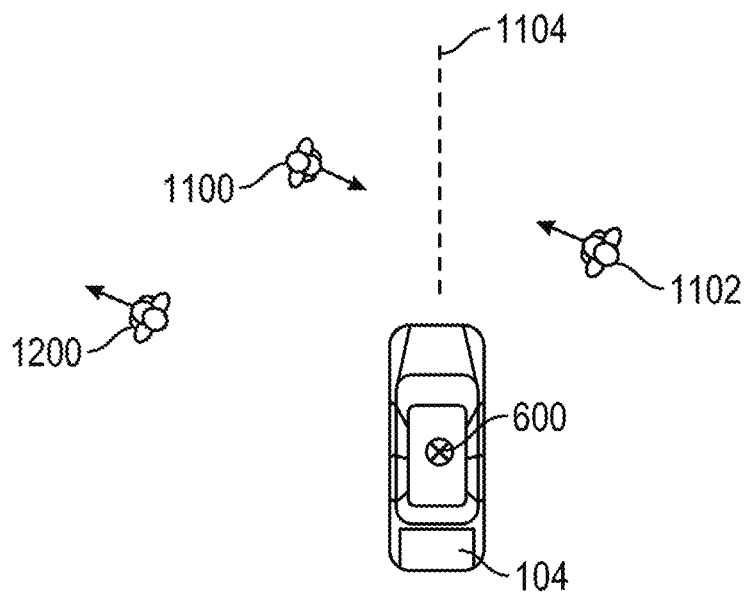
FIG. 12 is a schematic of a relative direction of a pedestrian with respect to a vehicle predicted path according to the disclosed subject matter.

At step S510, the controller 202 can determine from the pedestrian data 226 if there are one or more pedestrians available on or within a predetermined distance away from a path of the host vehicle 104. If more pedestrians are available in step S510, then at step S512 the controller 202 can determine if a pedestrian is valid. In one embodiment, the controller 202 can receive at least one second of pedestrian data 226 from VRU awareness messages broadcast from a V2P transceiver. However, the time threshold for VRU awareness messages is merely exemplary and can include higher or lower time thresholds than one second. For each valid pedestrian at step S512, the controller 202 can proceed to step S514 to execute an exemplary pedestrian classification algorithm. At step S514, the controller 202 can convert each set of latitude and longitude pedestrian data 226 into x,y coordinates. In one embodiment, each pedestrian x,y coordinates are assumed to be a center point of each pedestrian. At step S516, the controller 202 can build pedestrian polygons for each valid pedestrian's location and predicted path. In one embodiment, the number of polygons used in the path prediction can be hardcoded in the application. For example, in one embodiment a pedestrian path prediction of one polygon can be hardcoded in the application. However, the embodiments intend to include or otherwise cover any number of polygons for a path prediction of a pedestrian. A schematic for building pedestrian polygons is illustrated in FIG. 8. At step S518, the controller 202 can determine if the pedestrian polygon intersects or may intercept one or more of the predicted path vehicle polygons. Schematics of the embodiments are illustrated in FIGS. 9 and 10. At step S520, the controller 202 can classify a target. For example, the controller 202 can determine a position of the pedestrian 126 with respect to the host vehicle 104 (i.e., left or right side) and the alert appropriate for the target (i.e., to inform, alert, warn, etc. the host vehicle 104 and/or the pedestrian 126). This embodiment is illustrated in FIGS. 11 and 12. The process then proceeds back to the decision step S510 to determine if any more pedestrians are available. At step S510, if no more pedestrians are available to validate, then the process proceeds to step S522. Additionally, if, at step S512, a pedestrian is not valid, then the process likewise proceeds to step S522 to determine if there are any classified targets.

At step S522, the controller 202 can determine if there are any classified targets identified in the logic process S500. If no targets are classified, then at step S524 the system state for the V2P application remains in a default state. The controller 202 can actuate messages or warnings at step S528 to a driver using the heads up display 316 based on the default state. At step S522 if targets are classified, then in step S524 threat arbitration is performed by the controller 202 to determine the most critical threat(s) to the host vehicle 104. At step S526, the controller 202 can update the V2P system state of a V2P application. At step S528, the controller 202 can actuate one or more warnings to a driver of the host vehicle 104 using the heads up display 316 to inform, warn, or alert the driver based on the position of the pedestrian with respect to the host vehicle 104 and warning zone in step S520. The process S500 can end at step S530.

Figure 6:
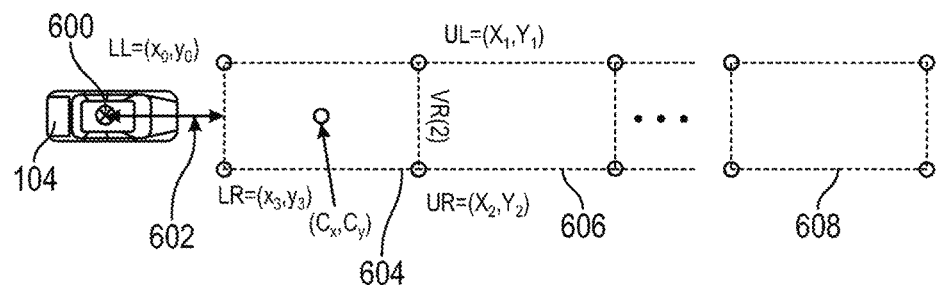
FIG. 6 is a schematic defining vehicle predicted path polygons according to the disclosed subject matter.

FIG. 6 is a schematic defining vehicle predicted path polygons. In the process 500, the controller 202 can define a vehicle center point 600 for the host vehicle 104 and convert latitude/longitude coordinates of the vehicle center point 600 into x,y coordinates. The controller 202 can define a bumper offset distance 602 from the vehicle center point 600 to the nearest edge of a first vehicle polygon 604. The first vehicle polygon can be defined with five coordinate points, a lower left point $LL=(x_0,y_0)$, an upper left point $UL=(x_1,y_1)$, an upper right point $UR=(x_2,y_2)$, a lower right point $LR=(x_3,y_3)$, and a center point $C=(c_x,c_y)$. A width of the first vehicle polygon 604 can be predefined as a distance of a road lane width. However, in the embodiments the width can be defined as wider as or smaller than a road lane but should be at least a width of the host vehicle 104. A length of the first vehicle polygon 604 can be defined as a relative distance that depends on a speed of the host vehicle 104. In one embodiment, a length of the first vehicle polygon 604 can be defined as a warning time in seconds multiplied by speed and divided by the number of vehicle polygons used in the application process. Other embodiments could use different calculations to determine a width and length of a vehicle polygon. The first vehicle polygon 604 can be defined as a vehicle rectangle VR(1). However, the embodiments intend to include or otherwise cover other polygonal shapes such as square, trapezoid, or any other shape that can implement the functions of the embodiments. The controller 202 can define a predetermined number of vehicle polygons in a predicted path of the host vehicle 104 that can be hardcoded into an application by the processor 216. For example, a second vehicle polygon (VR(2)) 606 and an Nth vehicle polygon 608 are defined in the predicted path of the host vehicle 104. The controller 202 can position the center points (e.g., $C=(c_x,c_y)$) of each vehicle polygon depending on the path prediction (curvature) and speed of the host vehicle 104. The embodiments are intended to include or otherwise cover any number of vehicle polygons 604, 606, 608 hardcoded into a V2P application by the processor 216 as well as any shape of the vehicle polygons 604, 606, 608. In some embodiments, the processor 216 can vary a shape of each defined vehicle polygon 604, 606, 608 even within the same hardcoded array as a predicted path of the host vehicle 104.

Figure 7:
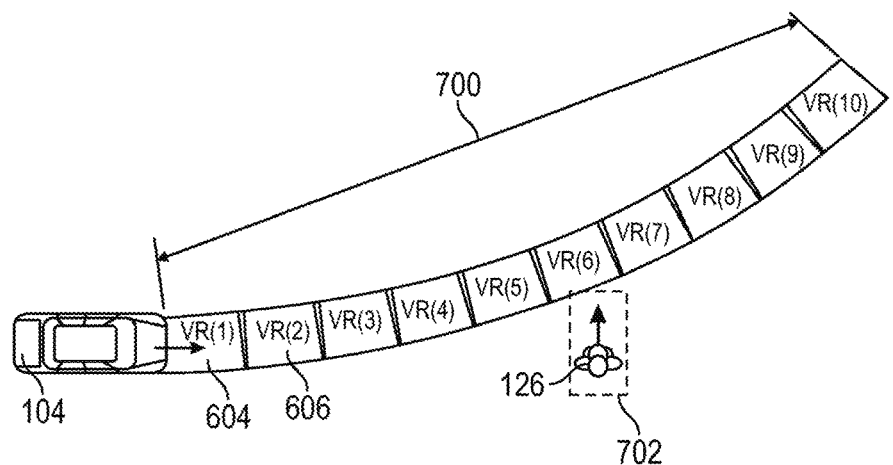
FIG. 7 is a schematic of vehicle predicted path polygons for a vehicle in a curve according to the disclosed subject matter.

FIG. 7 is a schematic of vehicle predicted path polygons for a vehicle in a curve. An array of vehicle polygons 700 ahead of the host vehicle 104 can include the first vehicle polygon VR(1) 604, the second vehicle polygon VR(2) 606, and a group of eight additional vehicle polygons labeled VR(3) to VR(10) and arranged in a curved path representing the predicted path of the host vehicle 104. The vehicle polygon array 700 can be hardcoded into the vehicle system data 224 or other areas of the memory 218 for use by the processor 216 and application manager 230 when implementing the embodiments. However, the number of vehicle polygons used in path prediction of the host vehicle 104 is exemplary, and the embodiments intend to include or otherwise cover any number of hardcoded vehicle polygons into the memory 218 for use by the processor 216 and application manager 230. In FIG. 7, the pedestrian 126 is positioned facing the vehicle polygon array 700 with an arrow representing movement. An exemplary pedestrian polygon 702 surrounds the pedestrian 126. An arrow represents pedestrian movement in a direction of the predicted path vehicle polygon array 700.

FIG. 8 is a schematic defining a pedestrian polygon 702 to represent a predicted path of the pedestrian 126. The controller 202 can define the pedestrian polygon 702 including a pedestrian center point 800 and convert latitude/longitude coordinates of the pedestrian center point 800 into x,y coordinates. The pedestrian polygon 702 can be subdivided into an always present polygon 704 within the pedestrian polygon 702. The controller can define the always present polygon 704 with predetermined distances around the pedestrian center point 800 whenever a pedestrian is targeted. If the pedestrian 126 is moving, the controller can add the pedestrian polygon 702 that is defined as a speed-dependent pedestrian polygon. The controller 202 can also define the pedestrian polygon 702 with five coordinate points, a lower left point $LL=(x_0,y_0)$, an upper left point $UL=(x_1,y_1)$, an upper right point $UR=(x_2,y_2)$, a lower right point $LR=(x_3,y_3)$, and the pedestrian center point $C=(c_x,c_y)$. A width of the pedestrian polygon 702 can be defined as a predetermined pedestrian offset distance to either side of the pedestrian center point, and a length of the pedestrian polygon 702 can be defined as a relative distance that depends on a speed of the pedestrian 126 (if moving). In one embodiment, a length of the pedestrian polygon 702 can be defined as a warning time in seconds multiplied by a pedestrian speed added to a doubled value of a pedestrian offset distance. Other embodiments could use different calculations to determine a width and length of a pedestrian polygon 702. The pedestrian polygon 702 can be defined as a pedestrian rectangle PR. However, the embodiments for a pedestrian polygon 702 and an always present polygon 704 are intended to include or otherwise cover other polygonal shapes such as square, trapezoid, or any other shape that can implement the functions of the embodiments. In alternative embodiments, the controller 202 can define additional pedestrian polygons in a predicted path of the pedestrian 126, for example, a second pedestrian polygon 702 could be defined in the predicted path of the pedestrian 126. The controller 202 can position the location of each pedestrian polygon 702 depending on the path prediction (curvature) of the pedestrian 126.

FIG. 9 is a schematic of vehicle and pedestrian predicted path polygons intersecting. FIG. 9 illustrates the first vehicle polygon 604, second vehicle polygon 606, and the vehicle polygon array 700 along a curve of a predicted path for the host vehicle 104 from FIG. 7. Implementation of the process steps to build vehicle polygons S508 and build pedestrian polygons S516 can proceed in step S518 to determining whether the vehicle polygon array 700 and pedestrian polygon 702 will intersect. In the scenario, the pedestrian 126 is moving in a direction towards the predicted path of the host vehicle 104 represented by the vehicle polygon array 700. Based on the vehicle system data 224 and pedestrian data 226, the controller 202 can determine that the pedestrian polygon 702 (predicted path of the pedestrian 126) will intersect the vehicle polygon array 700 (predicted path of the host vehicle 104) within vehicle polygon VR(6) (illustrated as a collision area 900).

FIG. 10 is a schematic of vehicle and pedestrian predicted path polygons not intersecting. FIG. 10 illustrates the first vehicle polygon 604, second vehicle polygon 606, and the vehicle polygon array 700 along a curve of a predicted path for the host vehicle 104 from FIG. 7. Implementation of the process steps to build vehicle polygons S508 and build pedestrian polygons S516 can proceed to a determination in step S518 of whether the vehicle and pedestrian polygons intersect. The pedestrian 126 is moving in a direction away from a predicted path of the host vehicle 104. Based on the vehicle system data 224 and pedestrian data 226, the controller 202 can determine the pedestrian polygon 702 of a predicted path of the pedestrian 126 will not intersect the vehicle polygon array 700.

FIG. 11 is a schematic of a relative position of a pedestrian with respect to a vehicle predicted path. FIG. 11 illustrates one embodiment of the process S520 to classify one or more target pedestrians. The controller 202 can determine whether a pedestrian that has been validated in step S512 is positioned on a left side or a right side of a longitudinal center line 1104 of a predicted path of the host vehicle 104. In the embodiments, the controller 202 can receive basic safety messages from a first target pedestrian 1100 and from a second target pedestrian 1102. The controller 202 can parse the basic safety messages for pedestrian location data (e.g., V2P GPS data) and plot the data relative to the center line 1104 of the host vehicle 104. In the example, the pedestrian data 226 received from the first target pedestrian 1100 plots to the left of the center line 1104 and therefore the relative position is classified LEFT of the host vehicle 104. In another example, pedestrian data 226 received from the second target pedestrian 1102 plots to the right of the center line 1104 and therefore the relative position is classified RIGHT of the host vehicle 104.

FIG. 12 is a schematic of a relative direction of a pedestrian with respect to a vehicle predicted path. FIG. 12 illustrates another embodiment of the process S520 to classify one or more target pedestrians. The controller 202 can determine whether a pedestrian that has been validated in step S512 is moving towards or away from the center line 1104 of the predicted path of the host vehicle 104. In the embodiments, the controller 202 can receive basic safety messages broadcast from the first target pedestrian 1100, the second target pedestrian 1102, and a third target pedestrian 1200. The controller 202 can parse the basic safety messages for pedestrian data 226 (e.g., V2P GPS data) and plot the locations over a predetermine time period relative to the center line 1104 of a predicted path of the host vehicle 104. The plot of pedestrian movement can determine direction of movement relative to the path of the host vehicle 104. In the example, location pedestrian data 226 received from the first target pedestrian 1100 can indicate movement to the right, and therefore the relative movement is classified as moving TO RIGHT of a pedestrian center point (towards the center line 1104). In another example, location pedestrian data 226 received from the second target pedestrian 1102 can indicate movement to the left and therefore the relative movement is classified as moving TO LEFT of a pedestrian center point (away from the center line 1104). In a further example, location data received from the third target pedestrian 1200 can indicate movement to the left and therefore the relative movement is classified as moving TO LEFT of a pedestrian center point (away from the center line 1104).

Figure 13:
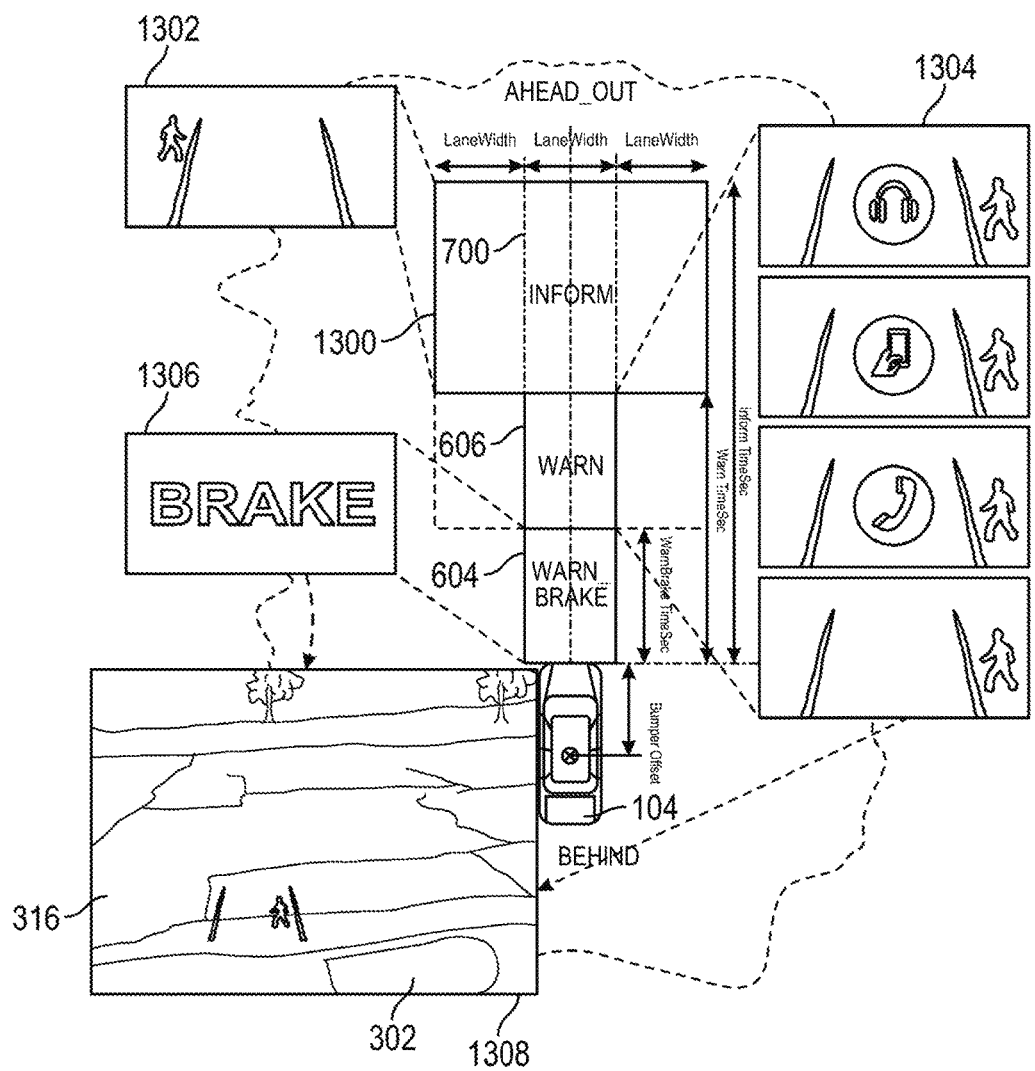
FIG. 13 is an in-vehicle implementation of a V2X system according to the disclosed subject matter.

FIG. 13 is a schematic of an exemplary V2P collision avoidance application implementation in a vehicle according to the disclosed subject matter. In FIG. 13, the heads-up display 316 is illustrated installed on the dashboard 302. The inside the vehicle view 1308 includes a pedestrian in the upper right hand corner indicating movement (walking) towards an apparent path of the host vehicle 104. The controller 202 has hardcoded the vehicle polygon array 700 ahead of the host vehicle 104 and assigned warning levels to the zones defined by one or more individual vehicle polygons within the vehicle polygon array 700. The warning levels can correspond to one or more graphical warnings depicting a graphical pedestrian on or near the predicted path of the host vehicle 104. The one or more graphical warnings can be displayed on the heads-up display 316 for the vehicle occupants to view. In an embodiment, the controller 202 can define the vehicle polygons VR3 to VR10 in the vehicle polygon array 700 as "Inform" zones. The controller 202 can also define a wider area 1300 than the predicted path vehicle polygon array 700, such as multiple lane widths wide, as an "Inform Zone." The first vehicle polygon 604 can be defined as a Warn-Brake zone. If a pedestrian polygon 702 intersects with the Warn-Brake zone, the controller 202 can display a Brake image 1306 on the heads-up display 316. The second vehicle polygon 606 can be defined as a warn zone. If a pedestrian polygon 702 intersects with the Warn zone, the controller 202 can display one or more alert images 1304 on the heads-up display 316 that show a location of the pedestrian 126 relative to the path of the host vehicle 104. The remaining vehicle polygons in the vehicle polygon array 700 can be defined as an Inform zone, either in the predicted path vehicle polygon array 700 width or an expanded warning zone 1300. If a pedestrian polygon 702 intersects with the expanded warning zone 1300, the controller 202 can display one or more inform images 1302 on the heads-up display 316.

If there are pedestrians in more than one zone, then the controller 202 can perform the threat arbitration process S524 by selecting a most critical pedestrian in the highest threat zone, such as the zone closest to the host vehicle. For example the controller 202 can first select to warn the host vehicle 104 of a pedestrian polygon 702 intersecting the first vehicle polygon 604 in the Warn-Brake zone if pedestrians are located in both the Warn-Brake zone and the Warn zone.

Figure 14:
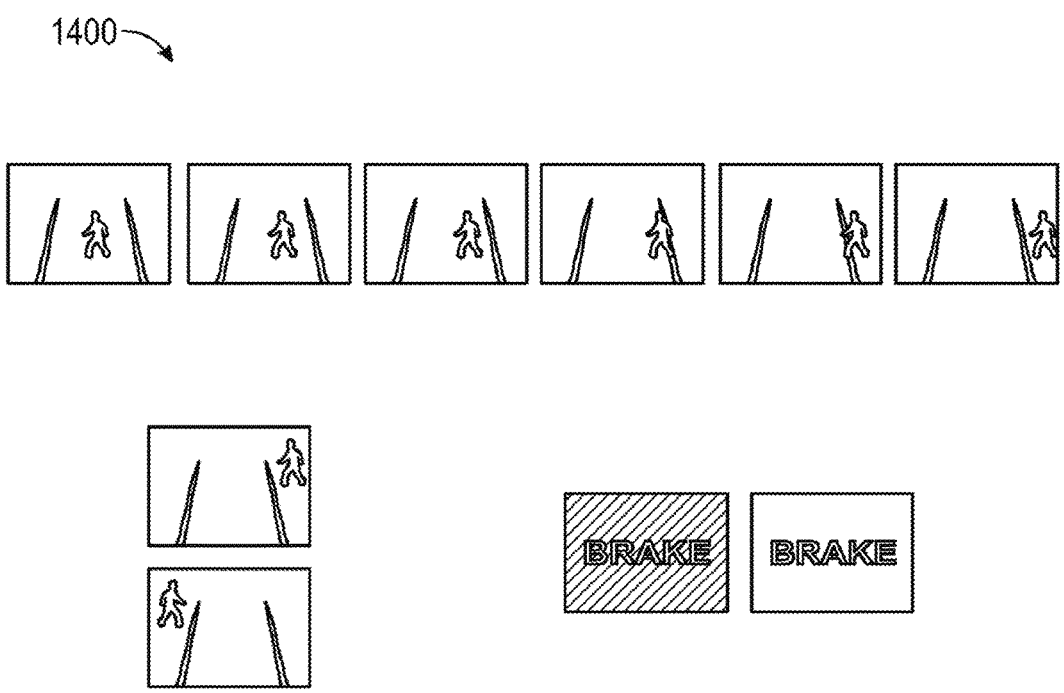
FIG. 14 is a schematic of graphical images of driver warnings according to the disclosed subject matter.

FIG. 14 is a schematic of graphical warnings to a driver for a V2P collision avoidance application according to the disclosed subject matter. The graphical warnings 1400 illustrated in FIG. 14 are exemplary, and the embodiments intend to include or otherwise cover other graphical, textual, or audible warnings the controller 202 can display on the heads-up display 316. The graphical warnings depict a symbol for a pedestrian at various positions near or within a predicted path of the host vehicle 104. The pedestrian symbol can be illustrated in a motion pose facing left or right from a center of a predicted path. Additionally, a "Brake" text warning can be displayed on the heads-up display 316 when a pedestrian polygon 702 intersects the Warn-Brake zone in vehicle polygon 604.

In this document, the terms "computer program product" and "computer-readable medium" may be used generally to refer to media such as, for example, memory, storage devices, storage unit, or signal(s) on channel. These and other forms of computer-readable media may be involved in providing one or more sequences of one or more instructions to processor for execution. Such instructions, generally referred to as "computer program code" (which may be grouped in the form of computer programs or other groupings), when executed, enable the controller 202 to perform features or functions of embodiments of the present invention.

In an embodiment where the elements are implemented using software, the software may be stored in a computer-readable medium and loaded into a computer system using, for example, removable storage unit, media drive or communications interface. The control logic (in this example, software instructions or computer program code), when executed by processor 216, causes processor 216 to perform the functions of the invention as described herein. The above described techniques may take the form of computer or controller implemented processes and apparatuses for practicing those methods. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the embodiments. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the embodiments. When implemented on a general-purpose microprocessor, the computer program code segments configure the microprocessor to create specific logic circuits.

V. Alternative Embodiments

While certain embodiments of the invention are described above, and FIGS. 1-14 disclose the best mode for practicing the various inventive aspects, it should be understood that the invention can be embodied and configured in many different ways without departing from the spirit and scope of the invention.

Exemplary embodiments are intended to include or otherwise cover any type of application for use by a vehicle's V2X computer system according to one or more user defined or automatically determined criteria.

Some of the exemplary embodiments are disclosed in the context of in-vehicle vehicle computer systems for V2X systems. However, any and all of the disclosed features can also be applied to other types of computer systems. In fact, some embodiments can be applied in contexts that do not involve vehicles.

Exemplary embodiments are intended to include or otherwise cover any type of a software-driven system for host vehicle 104 according to the embodiments that can be configured outside of the host vehicle 104 and that can communicate instructions and commands for execution of system operations. An example of a V2X system that can be configured outside of the host vehicle 104 is a V2X controller that is manufactured, tested, and configured as an individual unit, and the unit later installed within host vehicle 104. In other words, the various embodiments are not limited to vehicle V2X systems, and can alternatively or additionally be applied to other vehicle systems that include software and/or firmware.

Exemplary embodiments are intended to cover execution of method steps on any appropriate specialized or general purpose server, computer device, or processor in any order relative to one another. Some of the steps in the embodiments can be omitted, as desired, and executed in any order.

A computer architecture of the embodiments may be a general purpose computer and/or processor or a special purpose computer and/or processor. A computer and/or processor can be used to implement any components of the controller 202 or the computer-implemented methods of the embodiments. For example, components of the controller 202 can be implemented on a computer via its hardware, software program, firmware, or a combination thereof. Although individual computers or servers are shown in the embodiments, the computer functions relating to the controller 202 may be implemented in a distributed fashion on a number of similar platforms, to distribute the processing and/or functional load.

Embodiments are also intended to include or otherwise cover methods of using and methods of manufacturing the controller 202 disclosed above. The methods of manufacturing include or otherwise cover processors and computer programs implemented by processors used to design various elements of the controller 202 above. For example, embodiments are intended to cover processors and computer programs used to design or test the controller 202.

Exemplary embodiments are intended to cover all software or computer programs capable of enabling processors to execute instructions and implement the above operations, designs and determinations. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed above.

These computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl or other sufficient programming languages.

Embodiments are amenable to a variety of modifications and/or enhancements. For example, although the implementation of various components described above may be embodied in a hardware device, it can also be implemented as a software-only solution, e.g., an installation on an existing server. In addition, systems and their components as disclosed herein can be implemented as a firmware, firmware/software combination, firmware/hardware combination, or a hardware/firmware/software combination.

Some of the disclosed embodiments include or otherwise involve data transfer over a DSRC network, such as downloading update files over the network. The network may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), Wi-Fi networks, a Dedicated Short Range Communications (DSRC), network, short-wave radio, television, cable, satellite communications, and/or any other delivery or tunneling mechanism for carrying data. A network may include multiple networks or sub-networks, each of which may include, for example, a wired or wireless data pathway. The network may include a circuit-switched network, a packet-switched network, or any other network able to carry electronic communications. For example, the network may include networks based on the Internet protocol (IP) or asynchronous transfer mode (ATM).

While the subject matter has been described in detail with reference to exemplary embodiments thereof, it will be apparent to one skilled in the art that various changes can be made, and equivalents employed, without departing from the scope of the invention.

VI. Pedestrian Transition Detection

As mentioned above, a vehicle-to-pedestrian (V2P) communication system can also be applied to detection of a transition of a pedestrian. In particular, V2P enabled devices associated with the pedestrian can communicate with a vehicle to detect a driver-pedestrian transition (e.g., driver to pedestrian transition, or pedestrian to driver transition) and/or the intention of a pedestrian to traverse a roadway, for example, to interact with (e.g., drive, enter) a vehicle. In one example, the V2P communication system may be applied to detect a transition of a driver to a pedestrian and vice versa. This transition state information may be useful to help vehicles detect a potential pedestrian presence in the area, and may also be used to regulate a device associated with the pedestrian, for example, to turn message transmission ON or OFF at the device. Control of message transmission can help reduce power consumption of the device. Exemplary systems and methods directed to this exemplary embodiment will now be discussed in detail.

As discussed above, in FIG. 1, the pedestrian 126 can be associated with (e.g., wear, carry) the V2P transceiver 128. Further, the vehicle 144 can include the V2V transceiver 146. In some embodiments, the vehicle 144 can also be associated with the pedestrian 126. For example, the pedestrian 126 can have an intention to interact with the vehicle 144. More specifically, the pedestrian 126 can be a vehicle operator of the vehicle 144 and/or a passenger of the vehicle 144 with the intention of entering and/or exiting the vehicle 144. In some embodiments where pedestrian 126 can be a vehicle operator of the vehicle 144, the pedestrian may also have the intention to operate and/or cease operating the vehicle 144. In some scenarios, as shown in FIG. 1, in order to interact with the vehicle 144, for example to exit and/or enter the vehicle 144, the pedestrian 126 may need to initiate a cross-street transition by traversing a roadway of the intersection 102. In another example, after the pedestrian 126 enters the vehicle, a cross-street transition may apply to the vehicle 144 itself, where the vehicle 144 moves towards the roadway of the intersection 102. For example, the vehicle 144 may be entering the vicinity of the intersection 102 and/or crossing a roadway of the intersection 102. In these scenarios, the V2P communication system can be used to detect a possible pedestrian state transition and/or a roadway crossing, and notifications can be provided to alert other vehicles and/or entities to prepare for the possible pedestrian state transition and/or the possibility of a roadway crossing.

In the embodiments discussed herein, a pedestrian state transition indicates a change in the classification of a user (e.g., a pedestrian) or a change in the state of the user. For example, a change in a classification of the user from a pedestrian state to a driver state or a change in the classification of the user from a driver state to a pedestrian state. A pedestrian state indicates the user is a vulnerable road used (VRU), for example, a biological being traveling on foot or a biological being travelling using a mobility device, for example, roller skates, skateboards, scooters, strollers, wheelchairs, or other Electric Convenience Vehicles (ECVs). In contrast, a driver state indicates the user is being carried by a motor vehicle, for example, the user is a vehicle operator in control of the motor vehicle, or the user is a passenger carried by the motor vehicle.

Figure 15A:
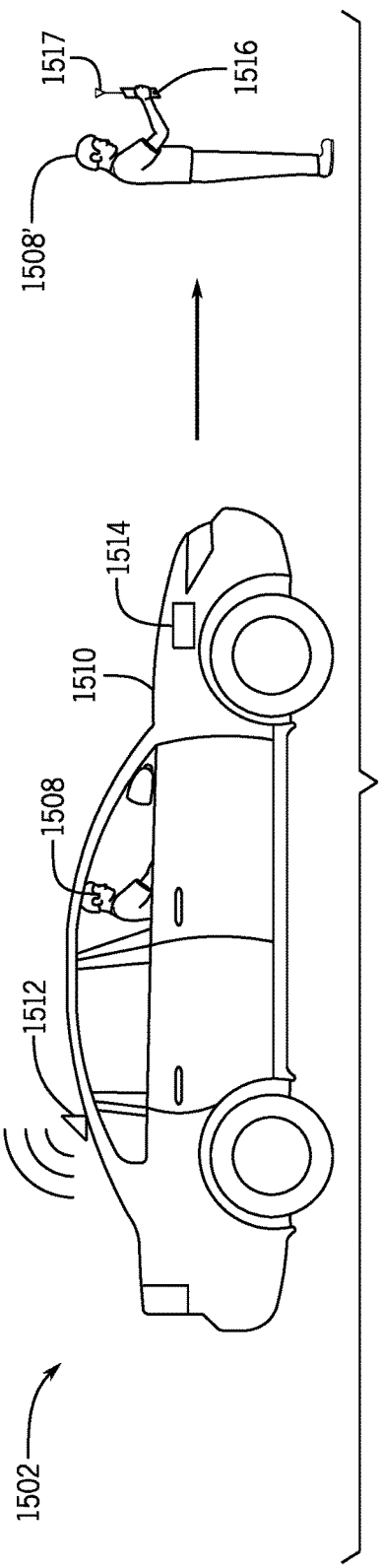
FIG. 15A is an illustrative example of a driver to pedestrian transition according to an exemplary embodiment.

A detailed example of pedestrian transition detection will now be described with FIGS. 15A and 15B and with further reference to FIGS. 1 and 2. FIG. 15A is an illustrative example of a driver to pedestrian transition 1502 (e.g., a change in the classification of the user from a driver state to a pedestrian state). The driver to pedestrian transition 1502 can occur, for example, when a driver parks a vehicle, exits the vehicle, and upon exiting the vehicle, the driver is now classified as a pedestrian. As another example, the driver to pedestrian transition 1502 can occur when a vehicle is in a stopped state, a vehicle passenger exits the vehicle, and upon exiting the vehicle, the vehicle passenger is now classified as a pedestrian. Thus, in some embodiments, the driver to pedestrian transition 1502 can indicate a vehicle exiting scenario where the user exits a vehicle and is classified as a pedestrian.

With respect to FIG. 15A, a user (e.g., the pedestrian 126) is in a driver state 1508 and transitions to a pedestrian state 1508'. In the driver state 1508, the user is within the vehicle 1510 (e.g., the vehicle 144). The vehicle 1510 includes a V2V transceiver 1512 (e.g., the V2V transceiver 146). Further, the vehicle 1510 includes a controller 1514 (e.g., the controller 202), which can be described as a V2P (or a V2V) device integrated with the vehicle 1510. In the pedestrian state 1508', the user is located externally from the vehicle 1510 and therefore is not driving the vehicle 1510 or being carried as a passenger in the vehicle 1510. As mentioned herein with FIG. 2, the user can be associated with the portable device 207. In FIG. 15A, the user in the pedestrian state 1508' is associated with a V2P device 1516 (e.g., the portable device 207), which is operable for wireless communication using a V2P transceiver 1517 (e.g., the V2V transceiver 128, the V2P transceiver 209). Although not shown in FIG. 15A, the V2P device 1516 can be carried with the user in either the driver state 1508 or the pedestrian state 1508'. Thus, in the driver state 1508 where the user is located inside the vehicle 1510, the V2P device 1516 can also be located within the vehicle 1510 (e.g., in a pocket of the user, docked within the vehicle 1510, placed on a seat of the vehicle 1510).

Figure 15B:
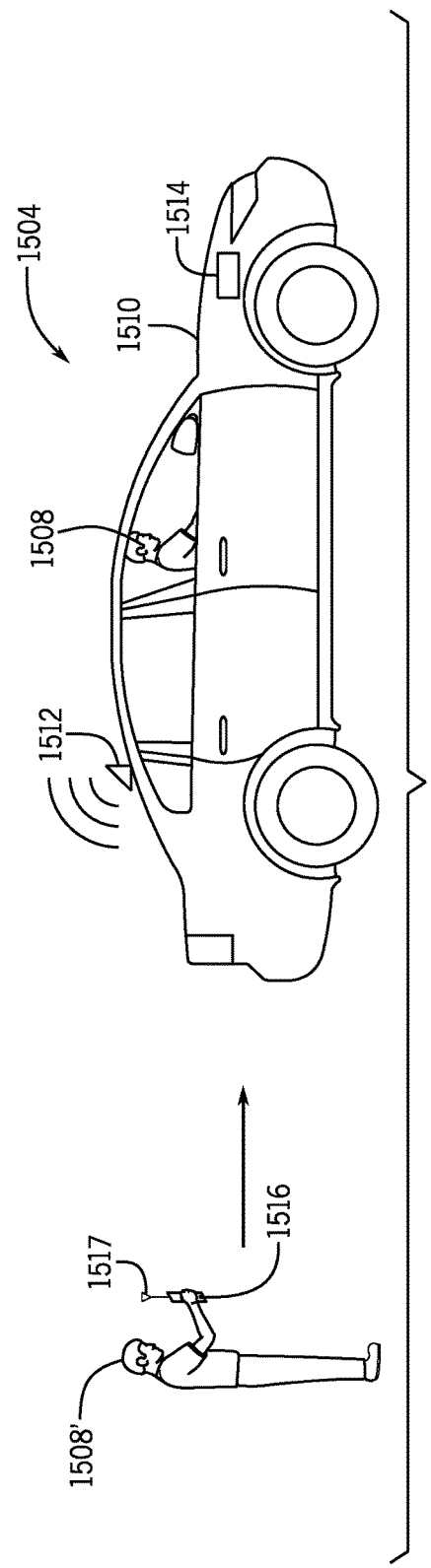
FIG. 15B is an illustrative example of a pedestrian to driver transition according to an exemplary embodiment.

FIG. 15B is an illustrative example of a pedestrian to driver transition 1504 (e.g., a change in the classification of a user from a pedestrian state to a driver state). A pedestrian to driver transition 1504 can occur, for example, when a pedestrian walks towards a vehicle associated with the pedestrian, enters the vehicle, and upon entering the vehicle, the pedestrian is now classified as a driver of the vehicle and/or a passenger of the vehicle. Thus, in some embodiments, a pedestrian to driver transition 1504 can indicate a vehicle entering scenario where the user enters a vehicle and is classified as a driver and/or a passenger.

With respect to FIG. 15B, the user (e.g., the pedestrian 126) is in a pedestrian state 1508' and transitions to a driver state 1508. Similar to FIG. 15A, in the pedestrian state 1508' the user can be associated with the V2P device 1516 (e.g., the portable device 207) which is operable for wireless communication using the V2P transceiver 1517 (e.g., the V2V transceiver 128, the V2P transceiver 209). In the driver state 1508, the user is located within the vehicle 1510 (e.g., the vehicle 144). The vehicle 1510 includes the V2V transceiver 1512. Further, the vehicle 1510 includes the controller 1514 (e.g., the controller 202), which can also be described as a V2P (or V2V) device 1514 integrated with the vehicle 1510. It is understood that in some embodiments (e.g., FIG. 2), the V2V transceiver is integrated with the V2P device 1514. As mentioned herein, the user can be associated with the portable device 207. In FIG. 15B, the user in the pedestrian state 1508' is associated with a V2P device 1516 (e.g., the portable device 207) which is operable for wireless communication using a V2P transceiver 1517 (e.g., the V2V transceiver 128, the V2P transceiver 209). Although not shown in FIG. 15B, the V2P device 1516 can be carried with the user in either the driver state 1508 or the pedestrian state 1508'. Thus, in the driver state 1508 where the user is located inside the vehicle 1510, the V2P device 1516 can also be located within the vehicle 1510 (e.g., in a pocket of the user, docked within the vehicle 1510, placed on a seat of the vehicle 1510).

FIGS. 16A and 16B are illustrative overhead examples of the pedestrian transitions shown in FIGS. 15A and 15B, but also including reference to components of the traffic scenario 100 of FIG. 1, namely, the remote vehicle 110 travelling along a roadway of the intersection 102. In particular, FIG. 16A illustrates an overhead view of a driver to pedestrian transition 1602. More specifically, a user (e.g., the pedestrian 126) transitions from a driver state 1508 to pedestrian state 1508'. Upon transitioning to the pedestrian state 1508', the user traverses a roadway of the intersection 102 as shown by a pedestrian state 1508". Thus, in this scenario, the user exits the vehicle 1510 and crosses a roadway. The driver to pedestrian transition 1602 of FIG. 16A can also be referred to as a vehicle exiting scenario where the user exits the vehicle 1510. Further, the driver to pedestrian transition 1602 illustrates a cross-street intention of the user to cross the roadway of the intersection 102. For example, as will be discussed herein, based on the driver state 1508 and/or the pedestrian state 1508', a cross-street intention can be determined indicating the user intends to cross the road way of the intersection 102.

FIG. 16B illustrates an overhead view of a pedestrian to driver transition 1604. In this scenario, a user (e.g., the pedestrian 126) is in a pedestrian state 1508' and traverses a roadway of the intersection 102 (e.g., in order to interact with the vehicle 1510) as shown by the pedestrian state 1508". The user then transitions from the pedestrian states 1508' and 1508" to the driver state 1508. The pedestrian to driver transition 1604 of FIG. 16B can also be referred to as a vehicle entering scenario where the user enters the vehicle 1510. Further, the pedestrian to driver transition 1604 illustrates a cross-street intention of the user to cross the roadway of the intersection 102, and subsequently cross the roadway. For example, as will be discussed herein, based on the pedestrian state 1508' a cross-street intention can be determined indicating the user intends to cross the road way of the intersection 102 and operate and/or enter the vehicle 1510. Although not shown in FIG. 16B, once the user transitions to the driver state 1508, the vehicle 1510 may also exhibit a cross-street intention. For example, the vehicle 1510 may move to enter the roadway of the intersection 102. Said differently, a cross-street intention of the vehicle 1510 can be determined based on the pedestrian to driver transition 1604 (e.g., the transition of the pedestrian state 1508' to the pedestrian state 1508" and the driver state 1508).

In both scenarios shown in FIGS. 16A and 16B, one or more entities in proximity to the user may be affected by the pedestrian state transition. More specifically, the remote vehicle 110, which is travelling along a path (e.g., roadway) of the intersection 102 can be affected by the user and/or the vehicle 1510 as a result of a pedestrian state transition. For example, in FIG. 16A, after transitioning to a pedestrian state 1508', the user can traverse the path of the remote vehicle 110. Here, the path of the pedestrian lies in front of the path of the remote vehicle. In FIG. 16B, prior to transitioning to a driver state 1508 and/or during the transition to a driver state 1508, the user path can also traverse the path of the remote vehicle 110. Although not shown, in FIG. 16B, after transitioning to the driver state 1508, the user and/or the vehicle 1510 could also affect the remote vehicle 110. For example, the vehicle 1510 could enter the path in proximity to the remote vehicle 110.

Figure 17:
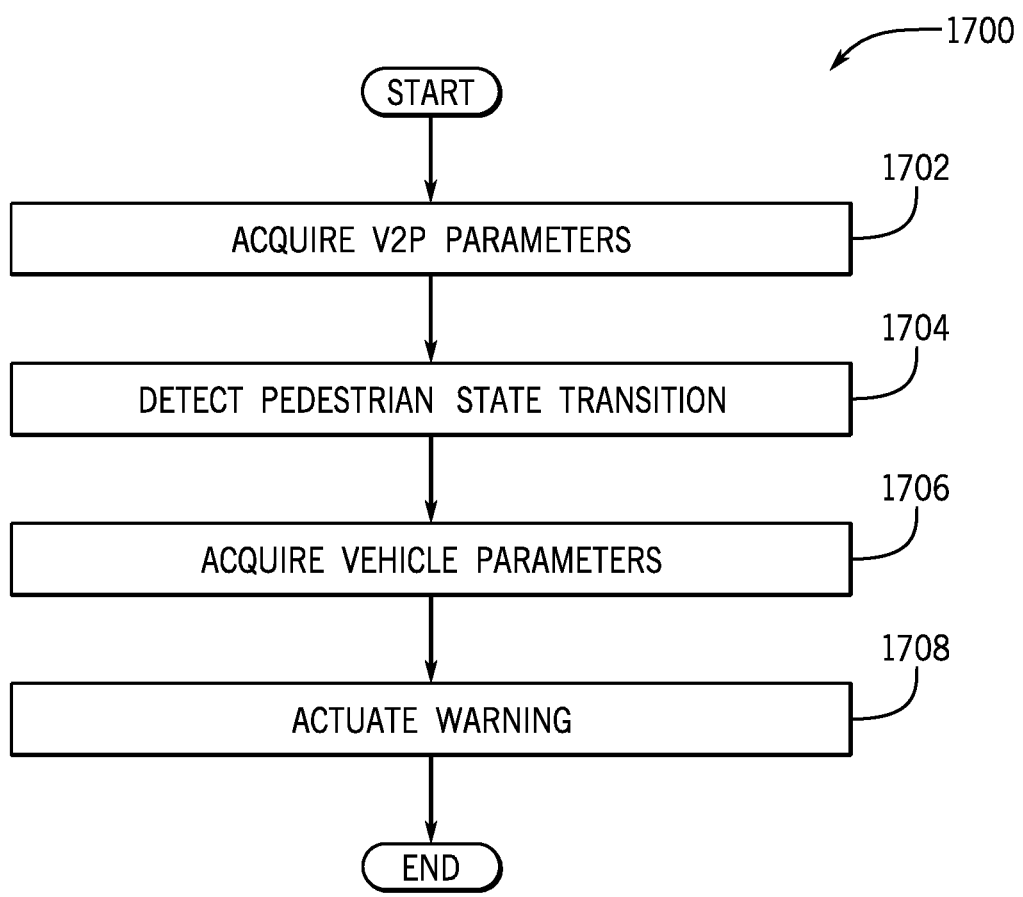
FIG. 17 is a process flow diagram for a method of operating a vehicle-to-pedestrian (V2P) communication system using pedestrian state transition detection according to an exemplary embodiment.

Accordingly, the V2P communication network can be utilized in these scenarios to identify and provide adequate notifications regarding the pedestrian state transition. More specifically, the remote vehicle 110 via the V2V transceiver 108, the vehicle 1510 via the V2V transceiver 1512, and the V2P device 1516 via the V2P transceiver 1517, are capable of wireless communication using the V2P communication network 204. Accordingly, V2P communication can be used to detect a pedestrian state transition and communication information about the pedestrian state transition to vehicles and/or other entities that may be affected by the pedestrian state transition. These illustrative examples will now be discussed in detail with an exemplary method 1700 for operating a vehicle-to-pedestrian (V2P) communication system show in FIG. 17. FIG. 17 will be described with reference to FIGS. 1, 2, 15A, 15B, 16A, and 16B.

The method 1700 of FIG. 17 includes at block 1702, acquiring V2P parameters from at least one of a first V2P device associated with a user or a second V2P device integrated with a vehicle associated with the user. The V2P parameters can be pedestrian data. Thus, V2P parameters can be received from a first V2P device 1516 (e.g., the portable device 207) associated with the user (e.g., the pedestrian 126) and/or a second V2P device 1514 integrated with the vehicle 1510. In some embodiments, the vehicle 1510 is associated with the user. For example, the user is the vehicle operator of the vehicle 1510 and/or a passenger of the vehicle 1510. The association of the user to the vehicle 1510 can be based on V2V parameter data (e.g., identification) from the first V2P device 1516 and/or the second V2P device 1514.

The V2P parameters can be received via the V2P communication network using, for example, DSRC. Thus, in some embodiments, communication messages (e.g., VRU messages, BSM messages) can be received by, for example, the processor 216, from the first V2P device 1516 and/or the second V2P device 1514. Although the examples and embodiments discussed herein are executed by the processor 216, it is understood that a processor of the first V2P device 1516, the second V2P device 1514, and/or the remote vehicle 110 can executed some or all of the same and similar functions as the processor 216.

The V2P data from the first V2P device 1516 and/or the second V2P device 1514 can be pedestrian data as discussed above, and can include, but is not limited to, pedestrian identification, location data such as latitude, longitude, and heading, speed, distance from a remote vehicle, a relative position and relative direction. Pedestrian data can also include, but is not limited to, data about the first V2P device 1516 associated with the user, for example, motion data about the first V2P device 1516 from motion sensors (e.g., accelerometers, gyroscope (not shown)) integrated with the first V2P device 1516.

In addition to the pedestrian data discussed above, V2P data from the second V2P device 1514 can also include vehicle parameters. The vehicle parameters can be received via the V2P communication network using, for example, DSRC. Vehicle parameters can include vehicle information related to the vehicle 1510 and vehicle systems of the vehicle 1510. For example, the vehicle parameters can include, but is not limited to, vehicle and/or vehicle system conditions, states, statuses, behaviors, and information about the external environment of the vehicle (e.g., other vehicles, pedestrians, objects, road conditions, weather conditions). Exemplary vehicle parameters include, but are not limited to, latitude, longitude, and heading, speed, yaw, wheel angle, longitudinal acceleration, brake actions, a number of pedestrians in front of the remote vehicle, calculations regarding the headings of both the vehicle and pedestrians, acceleration information, velocity information, steering information, lane departure information, blind spot monitoring information, braking information, collision warning information, navigation information, collision mitigation information and cruise control information. In further embodiments, the V2P data can include any data about the user and/or the vehicle 1510 associated with the user.

At block 1704, the method 1700 includes detecting a pedestrian state transition of the user based on the V2P parameters. As discussed above, the pedestrian state transition indicates at least one of a change in a classification of the user from a pedestrian state to a driver state or a change in the classification of the user from a driver state to a pedestrian state. The processor 216 can determine a change in a classification of the user based on the V2P data from the first V2P device 1516 associated with the user and/or a second V2P device 1514 integrated with the vehicle 1510. For example, the change in classification can be based on a communication status between the first V2P device 1516 and the second V2P device 1514, a transmission mode (e.g., park, drive) of the vehicle 1510, an ignition status of the vehicle 1510, an engine status of the vehicle 1510, a door open signal or a door closed signal of the vehicle 1510, a door unlock signal or a door lock signal of the vehicle 1510, a door unlock signal or a door lock signal transmitted by the first V2P device 1516 to the vehicle 1510, a movement pattern of the user towards or away from the vehicle 1510, a transmission sequence of a door unlock signal followed by a door lock signal or vice versa, a movement pattern of the first V2P device 1516, a location of the first V2P device 1516, any combination of the aforementioned data, among others. Further, in some embodiments, the processor 216 can determine a classification of the user based on the V2P parameters. To determine a change in the classification, the processor 216 can compare the classification of the user to a prior classification of the user, stored, for example, at the memory 218.

Illustrative examples of detecting a pedestrian state transition of the user based on the V2P parameters will now be discussed in more detail. It is understood that these illustrative examples are non-limiting and that one or more V2P parameters can be analyzed, combined and/or compared to determine a pedestrian state transition. One type of pedestrian state transition indicating a transition from a driver state to a pedestrian state occurs when a user parks the vehicle 1510 (i.e., engine OFF, ignition OFF) and/or exits the vehicle 1510. Accordingly, the processor 216 can receive V2P parameters from the vehicle 1510 including a transmission mode, an ignition status, an engine status, a door open signal, and/or a door unlock signal. Upon determining the vehicle 1510 is in a park transmission mode and a door open signal and/or a door unlock signal is activated at the vehicle 1510, the processor 216 can determine a pedestrian state transition from a driver state to a pedestrian state. Alternatively, if the engine has been to turned to OFF or an ignition key has been removed from the vehicle 1510, and a door open signal and/or a door unlock signal is activated at the vehicle 1510, the processor 216 can determine a pedestrian state transition from a driver state to a pedestrian state. These examples also illustrates an vehicle exiting scenario where the transition from a driver state to a pedestrian state includes the user exiting the vehicle 1510 (see FIG. 15A, 16A).

In another example, a pedestrian state transition indicating a transition from a driver state to a pedestrian state occurs based on an detecting a change in a communication status between the first V2P device 1516 and the second V2P device 1514. For example, if an operable connection for computer communication (e.g., Bluetooth) exists between the first V2P device 1516 and the second V2P device 1514, and the operable connection is deactivated (e.g., disconnected), the processor 216 can determine a pedestrian state transition from a driver state to a pedestrian state. Additionally, if the location of the first V2P device 1516 is initially determined to be within the vehicle 1510, and the location of the first V2P device 1516 is then determined to be located external to the vehicle 1510 and/or outside of a communication range of the vehicle 1510, the processor 216 can determine a pedestrian state transition of a driver state to a pedestrian state.

In a further example, a pedestrian state transition indicating a transition of a driver state to a pedestrian state occurs based on a transition of the first V2P device 1516 (e.g., a portable device associated with the user) from a vehicle state to a pedestrian state. For example, the first V2P device 1516 in a vehicle state may be characterized by constant movement during transport in the vehicle 1510, whereas the first V2P device 1516 may be characterized by abrupt or short movements as the first V2P device 1516 is moved from the interior of the vehicle 1510 to a location exterior to the vehicle 1510, thereby transitioning to a portable device carried by the user (i.e., a pedestrian). This abrupt and short movement may be detected based on motion data from motion sensors (e.g., accelerometer) integrated with the first V2P device 1516.

More specifically, in one embodiment, the pedestrian state transition indicating a transition from a driver state to a pedestrian state can be based on a movement pattern provided by sensor output associated with the first V2P device 1516. For example, an accelerometer (not shown) on the first V2P device 1516 may provide a 3-D acceleration pattern which is characteristic of movement of the first V2P device 1516 from an interior of the vehicle 1510 (e.g., sitting on the seat, in a bag, or in the pocket of the user) to outside the vehicle 1510. For example, after a period of generally horizontal movement while the vehicle 1510 is in motion, the horizontal movement may stop as the vehicle 1510 stops. Thereafter, the vertical acceleration may spike (e.g., first V2P device 1516 being picked up) followed by horizontal movement (e.g., first V2P device 1516 being handled within the vehicle 1510), and then vertical movement as the first V2P device 1516 exits the vehicle 1510 and stands up. The first V2P device 1516 may then experience a walking related movement pattern.

In some embodiments, this movement data of the first V2P device 1516 can combined with a door open or close signal and/or a door unlock or lock signal, or other data acquired by the vehicle 1510 or the first V2P device 1516 in order to confirm that the first V2P device 1516 is now outside the vehicle 1510 after the user exits the vehicle 1510. For example, in one aspect, the first V2P device 1516 may be able to sense operation of a door of the vehicle 1510 (e.g., audible or motion characteristic, signal from vehicle 1510) to predict a transition from a driver state to a pedestrian state.

The illustrative examples discussed above for detecting a pedestrian state transition indicating a transition from a driver state to a pedestrian state can, in some embodiments, be similarly applied to detecting a pedestrian state transition indicating a transition from a pedestrian state to a driver state. For example, one type of pedestrian state to driver state transition occurs when a user approaches and enters the vehicle 1510. In addition, the user may start the vehicle 1510 and/or the vehicle 1510 may begin moving. Accordingly, the processor 216 can receive a door unlock signal from the first V2P device 1516 and/or the vehicle 1510. For example, the user can approach the vehicle 1510 and actuate a door unlock signal using the first V2P device 1516 (e.g., functioning as a key fob). In addition, if the engine has been turned to ON, an ignition key has been inserted into the vehicle 1501, and/or a transmission mode of the vehicle is modified to a drive mode, the processor 216 can determine a pedestrian state transition from a pedestrian state to a driver state. These examples also illustrates an vehicle entering scenario where the transition from a pedestrian state to a driver state includes the user entering the vehicle 1510.

A pedestrian state transition indicating a transition from a pedestrian state to a driver state can also be detected based on an detecting a change in a communication status between the first V2P device 1516 and the second V2P device 1514. In this scenario, if an operable connection for computer communication (e.g., Bluetooth) is not activated and then the operable connection is activated (e.g., connected) between the first V2P device 1516 and the vehicle 1510, the processor 216 can determine a pedestrian state transition from a pedestrian state to a driver state. Additionally, if the location of the first V2P device 1516 is determined to be located within the vehicle 1510 and/or inside a communication range of the vehicle 1510, the processor 216 can determine a pedestrian state transition from a pedestrian state to a driver state.

In a further example, a pedestrian state transition indicating a transition from a pedestrian state to a driver state occurs based on a transition of the first V2P device 1516 (e.g., a portable device associated with the user) from a pedestrian state to a vehicle state. For example, the first V2P device 1516 in a pedestrian state may be characterized by a walking related movement pattern indicating the user is walking towards the vehicle 1510. As the user transitions to the driver state and the vehicle 1510 beings to move, the walking related movement patterns stop and the motion data of the first V2P device 1516 in the vehicle state may be characterized by constant movement during transport in the vehicle 1510.

In some embodiments, this movement data of the first V2P device 1516 can combined with a door open or close signal and/or a door unlock or lock signal, or other data acquired by the vehicle 1510 or the first V2P device 1516 in order to confirm that the first V2P device 1516 is now inside the vehicle 1510 after the user enters the vehicle 1510. For example, in one aspect, the first V2P device 1516 may be able to sense operation of a door of the vehicle 1510 (e.g., audible or motion characteristic, signal from vehicle 1510) to predict a transition from a pedestrian state to a driver state. As mentioned herein, the illustrative examples of detecting a pedestrian state transition of the user based on the V2P parameters discussed above are non-limiting, and it is understood that one or more V2P parameters not discussed above can be analyzed, combined and/or compared to determine a pedestrian state transition.

Once a pedestrian state transition is detected, at block 1706, the method 1700 includes acquiring vehicle parameters from a remote vehicle. The remote vehicle may be in the vicinity of the user, the vehicle 1510, a path of the user, or a path of the vehicle 1510. In other embodiments, at block 1706, data is received from one or more other entities that may be affected by a pedestrian state transition. Further, it is understood that in some embodiments, block 1706 can be performed in parallel to block 1702.

In one embodiment, the vehicle parameters are relevant to the location and movement of the remote vehicle 110. Vehicle parameters can include vehicle information related to the remote vehicle 110 and vehicle systems of the remote vehicle 110. For example, the vehicle parameters can include vehicle and/or vehicle system conditions, states, statuses, behaviors, and information about the external environment of the vehicle (e.g., other vehicles, pedestrians, objects, road conditions, weather conditions). Exemplary vehicle parameters include, but is not limited to, latitude, longitude, and heading, speed, yaw, wheel angle, longitudinal acceleration, brake actions, a number of pedestrians in front of the remote vehicle, calculations regarding the headings of both the vehicle and pedestrians, acceleration information, velocity information, steering information, lane departure information, blind spot monitoring information, braking information, collision warning information, navigation information, collision mitigation information and cruise control information.

The vehicle parameters can be received via the V2P communication network using, for example, DSRC. Accordingly, in one embodiment, the processor 216 can determine a current location of the remote vehicle 110 based on the vehicle parameters. Determining the current location of the remote vehicle 110 can help determine whether the remote vehicle 110 is in the vicinity of the user and/or the vehicle 1510 and whether the remote vehicle 110 should be notified about a potential pedestrian state transition. As mentioned above, in some embodiments, at block 1706, vehicle parameters and/or other data about other types of VRUs can also be acquired.

Accordingly, at block 1708, the method 1700 includes actuating a warning to at least one of the user or one or more entities in proximity to the user using the V2P parameters, the pedestrian state transition, and the vehicle parameters. The warning indicates the pedestrian state transition. Thus, in one embodiment, the processor 216 can generate and transmit (e.g., broadcast) a warning to one or more entities (e.g., the remote vehicle 110) in proximity to the user that may be affected by the pedestrian state transition.

Figure 19:
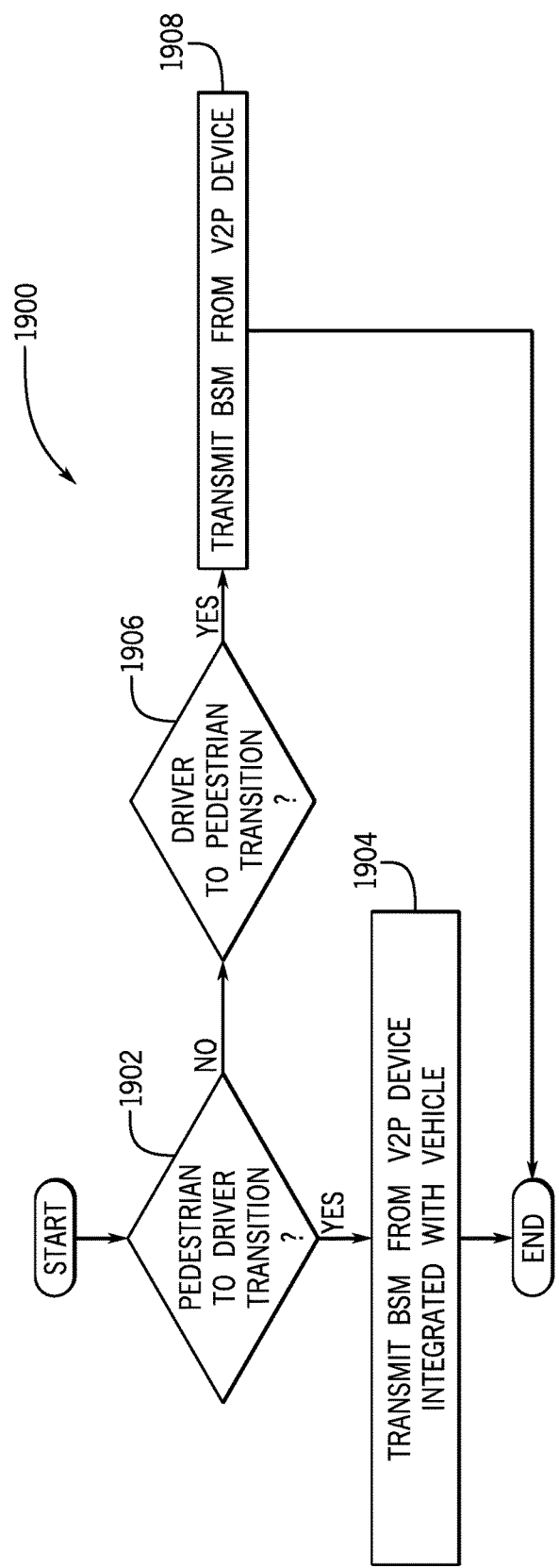
FIG. 19 is a process flow diagram for a method of controlling transmission of messages based on pedestrian state transition detection according to an exemplary embodiment.

In some embodiments, the warning can be generated and transmitted by the first V2P device 1516 to the remote vehicle 110, one or more other entities, or the second V2P device 1514. In other embodiments, the second V2P device 1514 can generate and transmit the warning to the remote vehicle 110, one or more other entities, or the first V2P device 1516. In further embodiments, the warning can be generated and transmitted by the remote vehicle 110. In embodiments where the first V2P device 1516 and/or the second V2P device 1514 is transmitting the warning, a determination can be made as to which device transmits warnings and/or other messages to entities using the V2P communication network. This embodiment will be discussed in further detail herein with FIG. 19.

Figure 18:
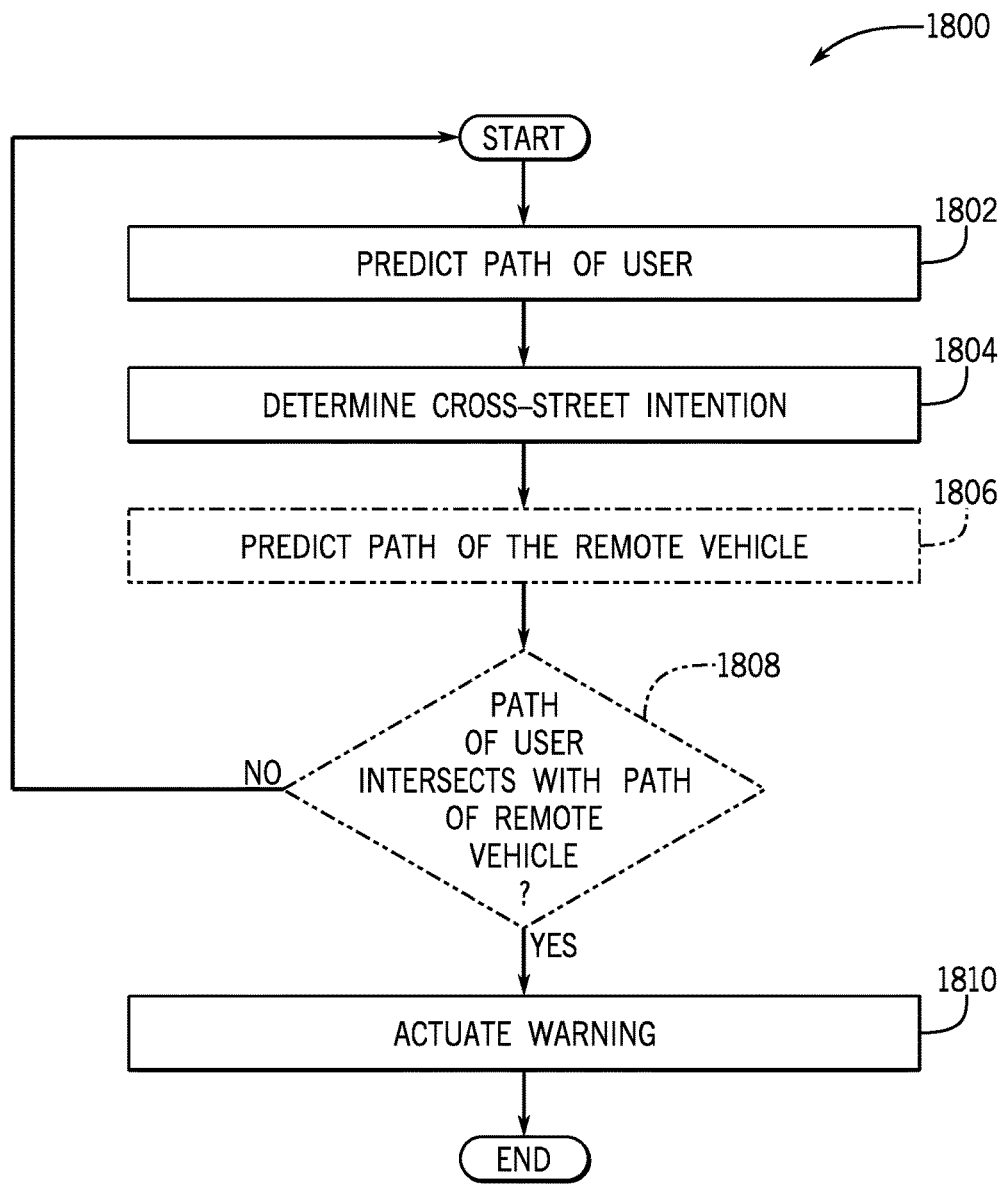
FIG. 18 is a process flow diagram for a method of path prediction using pedestrian state transition detection according to an exemplary embodiment.

In some embodiments, and in order to determine which entities may be affected by the pedestrian state transition and thus need to be warned about the pedestrian state transition (e.g., at block 1708), the V2P communication system can include path prediction and detection of a cross-street intention with respect to the pedestrian state transition. Referring now to FIG. 18, a method 1800 for path prediction using pedestrian state transition is shown. It is understood that the methods and systems discussed herein with respect to path prediction of a vehicle and/or a pedestrian can be implemented with the method 1800. For example, at block 1802, the method 1800 includes, predicting a path of the user based on the V2P parameters and the pedestrian state transition. The path of the user can be determined as discussed above in Section IV. For example, the controller 202 can build pedestrian polygons for the user's location and predicted path.

In some embodiments, predicting the path of the user includes predicting a cross-street intention of the user using the V2P parameters, the pedestrian state transition, and the vehicle parameters. As mentioned above, a cross-street intention indicates the user intends to intersect a path of the remote vehicle 110 during the pedestrian state transition of the user. Thus, at block 1804, the method 1800 includes determining a cross-street intention. As an illustrative example, in FIG. 16B, based on the V2P parameters from the first V2P device 1516 and the second V2P device 1514, the processor 216 can determine that the user at pedestrian state 1508' intends to cross a roadway of the intersection 102 in order to interact with the vehicle 1510. In this embodiment, the cross-street intention also indicates that the user intends to enter the vehicle 1510. For example, the processor 216 can determine based on a door unlock signal (e.g., generated by the first V2P device 1516) that the user intends to interact (e.g., enter) the vehicle 1510. Based on the location of the first V2P device, the location of the vehicle 1510, and/or path prediction as discussed herein, a cross-street intention can be determined since the user will need to cross the roadway of the intersection 102 to interact with the vehicle 1510.

In other embodiments, the cross-street intention indicates the user intends to exit the vehicle 1510. For example, in FIG. 16A, the processor 216 can determine the user is located in the vehicle 1510 and based on a door unlock signal (e.g., generated by the second V2P device 1514) that the user intends to interact (e.g., exit) the vehicle 1510. Additionally, after the user exits the vehicle 1510, V2P data (e.g., movement data, navigation data) from the first V2P device 1514 can be used determine the user intends to cross the roadway of the intersection 102.

Referring again to FIG. 18, at block 1806, the method 1800 can optionally include predicting a path of the remote vehicle. The path of the remote vehicle 110 can be determined as discussed above in Section IV. For example, the controller 202 can build vehicle path polygons for the remote vehicle's location and predicted path. The path of the remote vehicle 110 can be based on the vehicle parameters received from the remote vehicle 110. At block 1808, the method 1800 optionally includes determining whether a path of the remote vehicle intersects with the path of the user using the V2P parameters, the pedestrian state transition, and the vehicle parameters. The path of the remote vehicle 110 lies between the user and the vehicle 1510 associated with the user. Block 1808 can be determined based on the methods discussed above in Section IV. For example, the controller 202 can determine whether the vehicle polygons and the pedestrian polygons intersect. If the determination at block 1808 is YES, the method 1800 can proceed to block 1810.

At block 1810, similar to block 1708 of FIG. 17, the method 1800 includes actuating and/or generating a warning to the remote vehicle. If a roadway lies in between the remote vehicle 110 and the user, a device associated with the remote vehicle 110 or the user may send an alert (e.g., as part of a BSM) that a pedestrian is potentially intending to cross the roadway of the intersection 102. The surrounding drivers and pedestrians will be able to prepare for the presence of a pedestrian and the transition of the pedestrian to becoming a driver, along with the possibility of a roadway crossing.

As mention above, in addition to providing pedestrian state transition notifications using the V2P communication network, pedestrian state transition detection can also be used to regulate a device (e.g., the first V2P device 1516 and/or the second V2P device 1514) associated with the pedestrian, for example, to turn the safety message transmission ON or OFF for the purpose of reducing power consumption of V2P applications and transmissions associated with the device. An exemplary embodiment for controlling transmission of messages based on pedestrian transition detection will now be discussed in more detail with reference to method 1900 shown in FIG. 19.

As discussed in detail above, the first V2P device 1516 and the second V2P device 1514 are operable to transmit messages, for example, a Basic Safety Message (BSM) or VRU communication messages. Thus, transmission of the BSM from the first V2P device 1516 or the second V2P device 1514 can be controlled based on the pedestrian state transition. Said differently, the processor 216 can designate the first V2P device 1516 or the second V2P device 1514 as responsible (e.g., a master device) for transmitting a Basic Safety Message (BSM) associated with the user based on the pedestrian state transition. Thus, the processor 216 controls transmission of a Basic Safety Message (BSM) from at least one of the first V2P device 1516 associated with the user or the second V2P device 1514 integrated with the vehicle 1510 to the remote vehicle 110 and/or one or more other entities based on the pedestrian state transition.

Accordingly, at block 1902, the method 1900 includes determining if the pedestrian transition is a pedestrian to driver transition, for example, as discussed above with block 1704 of FIG. 17. Said differently, it is determined if the pedestrian state transition indicates the change in the classification of the user from the pedestrian state to the driver state. If the determination at block 1902 is YES, the method 1900 proceeds to block 1904.

At block 1904, the method 1900 includes controlling transmission of the BSM by controlling the second V2P device 1514 integrated with the vehicle 1510 to transmit the BSM when the pedestrian state transition indicates the change in the classification of the user from the pedestrian state to the driver state. Said differently, upon detecting a pedestrian state transition indicating the change in the classification of the user from a pedestrian state to a driver state, the second V2P device 1514 is controlled to transmit the BSM. Additionally, in one embodiment, upon determining the pedestrian to driver transition and setting the second V2P device 1514 as the master device to transmit the BSM, the processor 216 can turn off BSM messaging capabilities of the first V2P device 1516, for example, to save processing power.

If the determination at block 1902 is NO, the method 1900 proceeds to block 1906. Thus, if the pedestrian state transition indicates the change in the classification of the user from the driver state to the pedestrian state, the method 1900 includes at block 1908, controlling transmission of the BSM by controlling the first V2P device 1516 to transmit the BSM when the pedestrian state transition indicates the change in the classification of the user from the driver state to the pedestrian state. Said differently, upon detecting a pedestrian state transition indicating the change in the classification of the user from the driver state to the pedestrian state, the first V2P device 1516 is controlled to transmit the BSM. Additionally, in one embodiment, upon determining the driver to pedestrian transition and setting the first V2P device 1516 as the master device to transmit BSM, the processor 216 can turn off BSM messaging capabilities of the second V2P device 1514, for example, to save processing power.

The embodiments discussed herein can also be described and implemented in the context of computer-readable storage medium storing computer executable instructions. Computer-readable storage media includes computer storage media and communication media. For example, flash memory drives, digital versatile discs (DVDs), compact discs (CDs), floppy disks, and tape cassettes. Computer-readable storage media can include volatile and nonvolatile, removable and non-removable media implemented in any method or technology for storage of information such as computer readable instructions, data structures, modules or other data. Computer-readable storage media excludes non-transitory tangible media and propagated data signals.

It will be appreciated that various implementations of the above-disclosed and other features and functions, or alternatives or varieties thereof, can be desirably combined into many other different systems or applications. Also that various presently unforeseen or unanticipated alternatives, modifications, variations or improvements therein can be subsequently made by those skilled in the art which are also intended to be encompassed herein.

The invention claimed is:

1. A computer-implemented method of operating a vehicle-to-pedestrian (V2P) communication system, the computer-implemented method comprising:
   acquiring V2P parameters from at least one of a first V2P device associated with a user or a second V2P device integrated with a vehicle associated with the user;
   detecting a pedestrian state transition of the user based on the V2P parameters, wherein the pedestrian state transition indicates at least one of a change in a classification of the user from a pedestrian state to a driver state or a change in the classification of the user from a driver state to a pedestrian state; and
   actuating a warning to at least one of the user or one or more entities in proximity to the user using the V2P parameters and the pedestrian state transition, wherein the warning indicates the pedestrian state transition.

2. The computer-implemented method of claim 1, including predicting a path of the user based on the V2P parameters and the pedestrian state transition.

3. The computer-implemented method of claim 2, including acquiring vehicle parameters from a remote vehicle associated with a vehicle operator, the vehicle parameters are relevant to the remote vehicle's location and movement.

4. The computer-implemented method of claim 3, including determining whether a path of the remote vehicle intersects with the path of the user using the V2P parameters, the pedestrian state transition, and the vehicle parameters.

5. The computer-implemented method of claim 3, wherein predicting the path of the user includes predicting a cross-street intention of the user using the V2P parameters, the pedestrian state transition, and the vehicle parameters, wherein the cross-street intention indicates the user intends to intersect a path of the remote vehicle during the pedestrian state transition of the user.

6. The computer-implemented method of claim 5, wherein the cross-street intention indicates at least one of the user intends to exit the vehicle associated with the user or the user intends to enter the vehicle associated with the user.

7. The computer-implemented method of claim 1, wherein the first V2P device and the second V2P device are operable to transmit a Basic Safety Message (BSM).

8. The computer-implemented method of claim 7, including controlling transmission of the BSM from the first V2P device or the second V2P device based on the pedestrian state transition.

9. The computer-implemented method of claim 8, wherein controlling transmission of the BSM includes controlling the second V2P device to transmit the BSM when the pedestrian state transition indicates the change in the classification of the user from the pedestrian state to the driver state.

10. The computer-implemented method of claim 8, wherein controlling transmission of the BSM includes controlling the first V2P device to transmit the BSM when the pedestrian state transition indicates the change in the classification of the user from the driver state to the pedestrian state.

11. A vehicle-to-pedestrian (V2P) communication system, comprising:
    at least one of a first V2P device associated with a user or a second V2P device integrated with a vehicle associated with the user;
    a remote vehicle associated with a vehicle operator and including a V2V device operably connected for computer communication to the at least one of the first V2P device or the second V2P device using the V2P communication system; and
    a processor operably connected for computer communication to the remote vehicle and the at least one of the first V2P device or the second V2P device, wherein the processor:
    receives V2P parameters from the at least one of the first V2P device or the second V2P device and receives vehicle parameters from the remote vehicle;
    detects a pedestrian state transition of the user based on the V2P parameters, by detecting a change in a classification of the user from a pedestrian state to a driver state or a driver state to a pedestrian state; and
    generates a warning to at least one of the first V2P device, the second V2P device or the remote vehicle using the V2P parameters, the pedestrian state transition, and the vehicle parameters, wherein the warning indicates the pedestrian state transition.

12. The V2P communication system of claim 11, wherein the processor determines whether a path of the remote vehicle intersects with a path of the user using the V2P parameters, the pedestrian state transition, and the vehicle parameters.

13. The V2P communication system of claim 11, wherein upon determining the pedestrian state transition of the user is the change in the classification of the user from the pedestrian state to the driver state, the processor determines a cross-street intention of the user to traverse a path of the remote vehicle, wherein the path of the remote vehicle is located in between the user and the vehicle associated with the user.

14. The V2P communication system of claim 11, wherein the processor designates the first V2P device or the second V2P device as responsible for transmitting a Basic Safety Message (BSM) associated with the user based on the pedestrian state transition.

15. A vehicle control system for use with: a vehicle communications network, at least one source of V2P data about a user and about at least one of a first V2P device associated with the user or a second V2P device integrated with a vehicle associated with the user, at least one source of vehicle data about one or more remote vehicles, the control system, comprising:
    a processor that is configured to:
        access the V2P data and the vehicle data;
        detect a pedestrian state transition of the user based on the V2P data, wherein the pedestrian state transition indicates at least one of a change in a classification of the user from a pedestrian state to a driver state or a change in the classification of the user from a driver state to a pedestrian state;
        determine a path of the user based on the V2P data and the pedestrian state transition;
        determine a path of the remote vehicle based on the vehicle data; and
        actuate a warning to a vehicle operator using the V2P data, the pedestrian state transition, and the vehicle data, wherein the warning indicates the pedestrian state transition.

16. The vehicle control system of claim 15, wherein the processor predicts a path of the user based on the V2P data and the pedestrian state transition, and predicts a path of the one or more remote vehicles.

17. The vehicle control system of claim 16, wherein the processor determines whether the path of the user intersects with the path of the one or more remote vehicles.

18. The vehicle control system of claim 16, wherein the processor predicts a cross-street intention of the user using the V2P data and the pedestrian state transition, wherein the cross-street intention indicates the user intends to traverse a road and enter the vehicle associated with the user.

19. The vehicle control system of claim 18, wherein upon determining the road intersects with the path of the one or more remote vehicles, the processor actuates the warning to the vehicle operator.

20. The vehicle control system of claim 15, wherein the processor controls transmission of a Basic Safety Message (BSM) from at least one of the first V2P device associated with the user or the second V2P device integrated with the vehicle associated with the user to the one or more remote vehicles based on the pedestrian state transition.

\* \* \* \* \*